United States Patent [19]
Farley et al.

[11] Patent Number: 5,874,512
[45] Date of Patent: Feb. 23, 1999

[54] TACKIFIERS AND A PROCESS TO OBTAIN TACKIFIERS

[76] Inventors: James McCleod Farley, 123 McCarron Ct., League City, Tex. 77573; Martha Hetzel Robertson, 8735 Jones Connell Rd., Jackson, La. 70748; Charles Lewis Sims, 5928 Antioch Blvd., Baton Rouge, La. 70817

[21] Appl. No.: 932,511

[22] Filed: Sep. 18, 1997

Related U.S. Application Data

[63] Continuation of Ser. No. 568,910, Dec. 7, 1995, abandoned.

[51] Int. Cl.$^6$ ........................... C08L 45/00; C08F 212/06
[52] U.S. Cl. ......................... 526/308; 526/126; 526/127; 526/133; 526/134; 526/160; 526/170; 526/281; 526/282; 526/283; 526/347; 525/97; 525/98; 525/210; 525/211; 525/216; 524/553; 524/554; 156/334

[56] References Cited

U.S. PATENT DOCUMENTS

| | | | |
|---|---|---|---|
| 3,467,637 | 9/1969 | Prucnal | 260/80.78 |
| 3,470,145 | 9/1969 | Lipman | 260/897 |
| 3,862,068 | 1/1975 | Russell | 260/27 |
| 3,926,878 | 12/1975 | Shimizu et al. | 260/270 EV |
| 3,966,690 | 6/1976 | Mathews et al. | 526/283 |
| 4,022,723 | 5/1977 | Hokama et al. | 526/347 X |
| 4,286,077 | 8/1981 | St. Clair et al. | 525/232 |
| 4,288,567 | 9/1981 | Feeney et al. | 525/99 |
| 4,636,555 | 1/1987 | Luvinh et al. | 526/347 X |
| 5,003,019 | 3/1991 | Ishimaru et al. | 526/281 |
| 5,008,356 | 4/1991 | Ishimaru et al. | 526/281 |
| 5,059,487 | 10/1991 | Muro et al. | 428/500 |
| 5,077,386 | 12/1991 | Teng et al. | 528/487 |
| 5,087,677 | 2/1992 | Brekner et al. | 526/160 |
| 5,191,052 | 3/1993 | Welborn | 526/339 |
| 5,194,500 | 3/1993 | Chin et al. | 525/97 |
| 5,241,025 | 8/1993 | Hlatky et al. | 526/129 |
| 5,324,801 | 6/1994 | Brekner et al. | 526/160 |
| 5,434,115 | 7/1995 | Yamada et al. | 526/133 X |
| 5,552,489 | 9/1996 | Merrill et al. | 526/160 X |
| 5,602,219 | 2/1997 | Aulbach et al. | 526/160 |

FOREIGN PATENT DOCUMENTS

| | | |
|---|---|---|
| 0 283 164 | 9/1988 | European Pat. Off. . |
| 0 325 260 A2 | 7/1989 | European Pat. Off. . |
| 0 499 226 A1 | 8/1992 | European Pat. Off. . |
| 0 501 370 A1 | 9/1992 | European Pat. Off. . |
| 0 504 418 | 9/1992 | European Pat. Off. . |
| WO 94/07927 | 4/1994 | European Pat. Off. . |
| 0 610 851 | 8/1994 | European Pat. Off. . |
| 0 611 772 A2 | 8/1994 | European Pat. Off. . |
| 0 611 773 A2 | 8/1994 | European Pat. Off. . |
| 0 667 359 | 8/1995 | European Pat. Off. . |
| 1470759 A | 12/1968 | Germany . |
| 63-230707 | 9/1988 | Japan . |
| 6-136060 | 5/1994 | Japan . |
| 1071038 | 6/1967 | United Kingdom . |
| WO 91/13106 | 9/1991 | WIPO . |
| WO 91/18029 | 11/1991 | WIPO . |

OTHER PUBLICATIONS

Seymour et al., Polymer Chemistry . . . (2d ed.) Marcel Dekker, Inc., N.Y., 159–160, 1988.
Seymour et al., Polymer Chemistry . . . (2d ed.) Marcel Dekker, Inc., N.Y., 93–97, 1988.
Derwent Abstract (English Language) of JP 63–230707.

*Primary Examiner*—Fred Teskin
*Attorney, Agent, or Firm*—Frank E. Reid; John E. Schneider

[57] ABSTRACT

Resins which are the copolymers of an alpha-olefin, a cyclic olefin, and an aromatic-group-containing monomer are provided. The cyclic olefins retain their cyclic structures and the aromatic-group-containing monomers retain their aromatic structures after copolymerization into the resin product. Methods for production of the new resins in the presence of a metallocene catalyst system are also provided. New adhesive compositions containing the resin and articles using the new adhesive compositions are also part of the invention.

19 Claims, 3 Drawing Sheets

TACKIFIERS AND A PROCESS TO OBTAIN TACKIFIERS

This is a continuation of application Ser. No. 08/568,910, filed Dec. 7, 1995, now abandoned.

FIELD OF THE INVENTION

This invention relates to synthetic resins useful as tackifiers, methods to produce these resins, adhesive compositions containing these resins, and articles using the adhesive compositions.

BACKGROUND OF THE INVENTION

Tackifier resins typically have a low number average molecular weight ($M_n$) for compatibility and a high glass transition temperature ($T_g$) for strength. Blending a tackifier resin with a higher molecular weight elastomer or base polymer, generally results in a blend that is particularly desirable in adhesive and sealant applications. The tack and adhesion properties of various base polymers can be significantly improved by combining the base polymer with a tackifier resin to produce a blend having a lower number average molecular weight and a higher glass transition temperature ($T_g$) than the unblended base polymer. Tackifiers can be synthesized to contain only carbon and hydrogen, as in petroleum resins and polyterpenes, or can also contain oxygen such as coumarone-indenes or can be recovered from naturally occurring substances such as rosin esters.

Tackifiers are typically low molecular weight hydrocarbon resins produced by the polymerization of various feedstocks, typically olefin, diolefin, aliphatic, aromatic, or mixtures thereof. Typical polymerization systems include carbocationic and thermal polymerization.

Carbocationic polymerization of tackifier resins typically uses a Friedel-Crafts catalyst to polymerize aliphatic and/or aromatic monomers, such as disclosed in U.S. Pat. No. 3,966,690. Typical aliphatic monomers are $C_5$ to $C_6$ paraffins, olefins, and diolefins. Typical aromatic monomers are alkylated benzenes or higher aromatics containing at least one vinylic unsaturation. However, because of the low catalyst activity levels combined with high catalyst to monomer ratios attributable to a Friedel-Crafts process, this process requires additional processing steps to purify the resin. These additional process steps result in aluminous waste water and chlorinated organic by-products which must be accounted for in the overall production costs. Furthermore, Friedel-Crafts produced resins typically result in relatively high Gardner color values of greater than 2. A lower color is desirable for many commercial applications. Thus, in order to reduce the color of the resins, further costly processing such as hydrogenation is required prior to use.

Thermal polymerization of tackifiers is typically a Diels-Alder reaction of cyclopentadiene and/or dicyclopentadiene derivatives, and optionally $C_4$–$C_5$ acyclic conjugated dienes and/or alkyl aromatic monomers containing at least one polymerizable group. Thermal polymerization takes place without a catalyst, therefore eliminating the costs associated with aluminous water and chlorinated by-products. However, tackifier resins produced by thermal polymerization have a high degree of unsaturation resulting in a Gardner color typically greater than 5. Therefore, to meet many commercial requirements, additional costly processing steps are required to reduce the color of the resins. For additional background on traditional hydrocarbon resins useful as tackifiers, see *Kirk-Othmer Encyclopedia of Chemical Technology*, 4th ed., 1995, vol. 13, pp. 717–743.

Until now useful tackifiers have not typically been produced using coordination catalysis. Coordination catalysis, such as traditional Ziegler-Natta polymerization systems, have not been used to produce polymers having both a low $M_n$ and a high $T_g$ generally needed in tackifier applications. Titanium-based catalyst systems using organoaluminum cocatalysts are known to copolymerize ethylene and cyclic-olefins. However, these titanium-based processes suffer from inefficiencies in comonomer incorporation and the presence of side reactions, such as ring opening polymerization of the cyclic-olefin, resulting in copolymers having a broad molecular weight distribution. Vanadium-based catalyst systems using organoaluminum cocatalysts offer improved comonomer incorporation relative to titanium, but because the polymerization activity is generally very low, these types of catalyst are not typically used commercially.

U.S. Pat. No. 5,059,487 discloses a hot melt adhesive comprising a vinyl-aromatic compound/conjugated diene copolymer, an alicyclic hydrocarbon resin tackifier, and a random cyclic copolymer of ethylene and a cyclic olefin. The cyclic copolymer is not a tackifier as it is added to improve high temperature performance and can only be added to the adhesive in limited quantities since it increases the viscosity of the adhesive.

U.S. Pat. No. 5,003,019 discloses the use of a metallocene catalyst system using an alumoxane activator to produce copolymers of cyclic-olefins and alpha-olefins, but demonstrate only high $M_n$ thermoplastics. EPA 0 504 418 A1 discloses a metallocene coordination catalyst system to produce homopolymers and copolymers of cyclic-olefins with either very high or very low $T_g$'s, but demonstrate only homopolymers or high $M_n$ copolymers either of which have little value for typical tackifier applications.

Thus, the need exists for novel tackifiers having a desirably low $M_n$ and high $T_g$ while offering the further advantage of possessing good color. Furthermore, a need exists to produce low color tackifier resins without the need for additional costly processing steps. A production process minimizing aluminous waste water and chlorinated organic by-products would also be desirable.

SUMMARY OF THE INVENTION

This invention relates to novel hydrocarbon resins useful as tackifiers, methods to produce those resins, adhesive compositions containing these resins, and articles comprising the adhesives. Preferred novel tackifier resins of this invention are polymers of at least one alpha-olefin, at least one cyclic olefin, and at least one aromatic-group-containing monomer. A preferred process to produce these improved tackifiers comprises polymerizing an alpha-olefin monomer, a cyclic monomer, and an aromatic-group-containing monomer in the presence of a coordination catalyst system such as a cyclopentadienyl transition metal compound or derivatives thereof combined with an activator such as alumoxane or a non-coordinating anion activator. After polymerization, the cyclic structures of the cyclic olefin monomers and the aromatic structures of the aromatic-group-containing monomers remain substantially intact after polymerization.

DETAILED DESCRIPTION OF THE INVENTION

Tackifier Production Process

Figure 1:
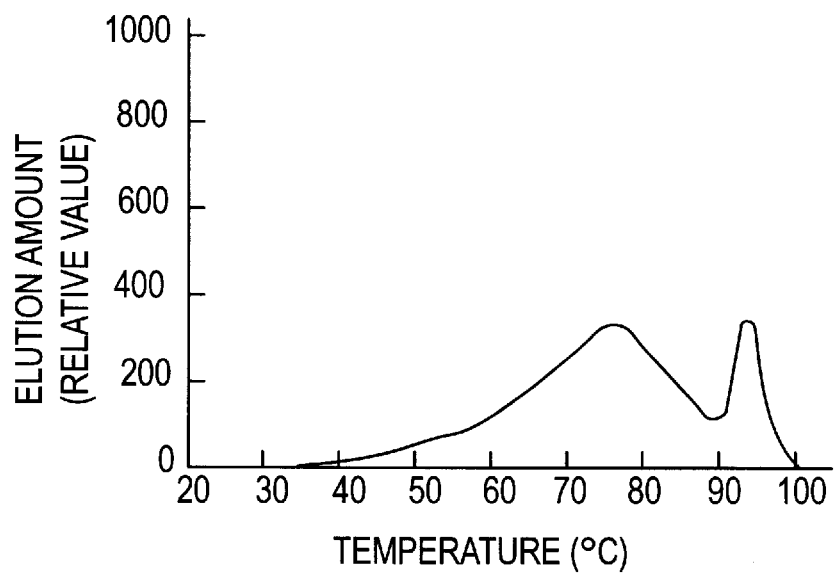

The hydrocarbon resins of this invention are produced using a coordination-insertion catalyst system to polymerize at least one alpha-olefin, at least one cyclic olefin, and at least one aromatic-group-containing monomer. The tackifier produced is a hydrocarbon resin which is the polymerization reaction product of at least one alpha-olefin, at least one cyclic olefin, and at least one aromatic-group-containing monomer, wherein the cyclic structures of the cyclic olefin monomers and the aromatic structures of the aromatic-group-containing monomers remain.

Monomers

Preferred alpha-olefins that can be polymerized to produce tackifiers by this process include one or more of ethylene and linear or branched $C_3$ to $C_{20}$ alpha-olefins, preferably ethylene or $C_3$ to $C_8$ alpha-olefins, more preferably propylene, 1-butene, 1-hexene, 4methyl-1-pentene, 3-methyl-1-pentene, 3,5,5-trimethyl-1-hexene, and 1-octene, even more preferably propylene or 1-butene. For purposes of this specification and appended claims, "alpha-olefin" as defined herein includes ethylene unless a specific range of carbon atoms is otherwise specified. In one embodiment, the alpha-olefin can contain cyclic structures that are fully saturated such that the alpha-olefin monomer does not contain a cyclic moiety with any olefinic unsaturation or any aromatic structures. Preferred alpha-olefins are mono-olefins.

Preferred cyclic olefins that can be polymerized to produce tackifiers by this process contain up to 30 carbon atoms, contain at least one cyclic structure with at least one olefinic unsaturation in a cyclic structure, and do not contain any aromatic structures. In general, any cyclic olefin can be polymerized with an alpha-olefin and an aromatic-group-containing monomer in the present process. Preferred cyclic olefins include but are not limited to one or more of dicyclopentadiene, cyclopentadiene, norbornene, ethylidene norbornene, ethylene norbornene, vinyl norbornene, methylnorbornene, ethylnorbornene, methylcyclopentadiene, tetracyclodecene, methyltetracyclodecene, and the like or substituted versions thereof. Typical moieties for substitution of hydrogen atoms are $C_1$ to $C_{10}$ hydrocarbyl groups including linear or branched alkyl groups. Preferred cyclic olefins are mono-olefins or non-conjugated dienes. Cyclic olefins containing conjugated dienes are preferably present in the tackifier at less than 1 weight percent. In a preferred embodiment the cyclic olefin monomer to be used in this invention is a dimer or a trimer of a cyclic olefin, wherein the dimer or trimer contains at least one polymerizable olefinic unsaturation. In another preferred embodiment, the cyclic olefin is a co-dimer of two different monomers wherein the co-dimer contains at least one polymerizable olefinic unsaturation. One type of preferred co-dimer is prepared from cyclopentadiene and an alicyclic olefin or diolefin such as piperylene or isoprene. Preferred cyclic olefins include cyclized ethylenic unsaturation which polymerizes in the presence of the metallocene catalyst substantially by insertion polymerization, without detectable ring opening as measured by fourier transform infrared spectroscopy (FTIR), nuclear magnetic resonance (NMR), or similar methods. For example, the proton chemical shift assignments for polynorbornene are known. The noticeable absence of well defined resonating peaks near 5.3 and 5.5 ppm and in the region of 2.4–3.0 ppm in the proton nuclear magnetic resonance spectrum of the present norbornene-containing tackifiers indicate no or substantially no ring-opened product was formed. Therefore, the ring structure in which the unsaturation is present is incorporated into or appended to the polymer backbone intact.

In one embodiment, the cyclic olefins contain one polymerizable double bond as shown in formulae 1-3 below:

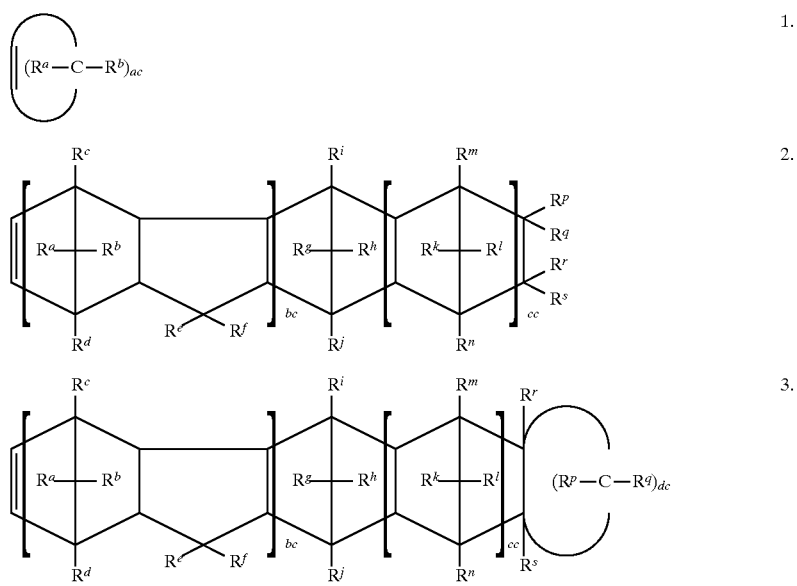

wherein each $R^a$ through $R^s$ is independently hydrogen, a halogen, a hydrocarbyl, or a halohydrocarbyl, preferably a hydrogen or hydrocarbyl; ac and dc are integers of 2 or more, and bc and cc are independently integers of 0 or more, preferably 0, 1, or 2. Preferred hydrocarbyls and halohydrocarbyl can be linear, cyclic, or branched, preferably linear or branched, and contain from 1 to 30 carbon atoms, more preferably from 1 to 4 carbon atoms. Preferred linear or branched hydrocarbyls, or alkyls, contain no olefinic unsaturation.

Preferred monocyclic olefins according to formula 1 have from 4 to 12 carbon atoms, more preferably 5 to 10 carbon atoms. Specific representative cyclic olefins according to formula 1 are as follows: cyclobutene, cyclopentene; 3-methylcyclopentene; 4-methylcyclopentene; 3,4-dimethylcyclopentene; 3,5-dimethylcyclopentene; 3-chlorocyclopentene; cyclohexene; 3-methylcyclohexene; 4-methylcyclohexene; 3,4-dimethylcyclohexene; 3-chlorocyclohexene; cycloheptene; and cyclododecene.

Specific representative cyclic olefins according to formula 2 are as follows:
norbornene;
5-methyl-2-norbornene;
5,6-dimethyl-2-norbornene;
1-methyl-2-norbornene;
5-ethyl-2-norbornene;
5-n-butyl-2-norbornene;
5-isobutyl-2-norbornene;
7-methyl-2-norbornene;
tetracyclo(4.4.0.1$^{2,5}$.1$^{7,10}$)-3-dodecene;
2-methyltetracyclo(4.4.0.1$^{2,5}$.1$^{7,10}$)-3-dodecene;
2-ethyltetracyclo(4.4.0.1$^{2,5}$.1$^{7,10}$)-3-dodecene;
2-propyltetracyclo(4.4.0.1$^{2,5}$.1$^{7,10}$)-3-dodecene;
2-hexyltetracyclo(4.4.0.1$^{2,5}$.1$^{7,10}$)-3-dodecene;
2-stearyltetracyclo(4.4.0.1$^{2,5}$.1$^{7,10}$)-3-dodecene;
2,3-dimethyltetracyclo(4.4.0.1$^{2,5}$.1$^{7,10}$)-3-dodecene;
2-methyl-3-ethyltetracyclo(4.4.0.1$^{2,5}$.1$^{7,10}$)-3-dodecene;
2-chlorotetracyclo(4.4.0.1$^{2,5}$.1$^{7,10}$)-3-dodecene;
2-bromotetracyclo(4.4.0.1$^{2,5}$.1$^{7,10}$)-3-dodecene;
2,3-dichlorotetracyclo(4.4.0.1$^{2,5}$.1$^{7,10}$)-3-dodecene;
2-cyclohexyltetracyclo(4.4.0.1$^{2,5}$.1$^{7,10}$)-3-dodecene;
2-n-butyltetracyclo(4.4.0.1$^{2,5}$.1$^{7,10}$)-3-dodecene;
2-isobutyltetracyclo(4.4.0.1$^{2,5}$.1$^{7,10}$)-3-dodecene;
5,10-dimethyltetracyclo(4.4.0.1$^{2,5}$.1$^{7,10}$)-3-dodecene;
2,10-dimethyltetracyclo(4.4.0.1$^{2,5}$.1$^{7,10}$)-3-dodecene;
11, 12-dimethyltetracyclo(4.4.0.1$^{2,5}$.1$^{7,10}$)-3-dodecene;
2,7,9-trimethyltetracyclo(4.4.0.1$^{2,5}$.1$^{7,10}$)-3-dodecene;
9-ethyl-2,7-dimethyltetracyclo(4.4.0.1$^{2,5}$.1$^{7,10}$)-3-dodecene;
9-isobutyl-2,7-dimethyltetracyclo(4.4.0.1$^{2,5}$.1$^{7,10}$)-3-dodecene;
9,11,12-trimethyltetracyclo(4.4.0.1$^{2,5}$.1$^{7,10}$)-3-dodecene;
9-ethyl-11,12-dimethyltetracyclo(4.4.0.1$^{2,5}$.1$^{7,10}$)-3-dodecene;
9-isobutyl-11,12-dimethyltetracyclo(4.4.0.1$^{2,5}$.1$^{7,10}$)-3-dodecene;
5,8,9,10-tetramethyltetracyclo(4.4.0.1$^{2,5}$.1$^{7,10}$)-3-dodecene;
8-methyltetracyclo(4.4.0.1$^{2,5}$.1$^{7,10}$)-3-dodecene;
8-ethyltetracyclo(4.4.0.1$^{2,5}$.1$^{7,10}$)-3-dodecene;
8-propyltetracyclo(4.4.0.1$^{2,5}$.1$^{7,10}$)-3-dodecene;
8-hexyltetracyclo(4.4.0.1$^{2,5}$.1$^{7,10}$)-3-dodecene;
8-stearyltetracyclo(4.4.0.1$^{2,5}$.1$^{7,10}$)-3-dodecene;
8,9-dimethyltetracyclo(4.4.0.1$^{2,5}$.1$^{7,10}$)-3-dodecene;
8-methyl-9-ethyltetracyclo(4.4.0.1$^{2,5}$.1$^{7,10}$)-3-dodecene;
8-chlorotetracyclo(4.4.0.1$^{2,5}$.1$^{7,10}$)-3-dodecene;
8-bromotetracyclo(4.4.0.1$^{2,5}$.1$^{7,10}$)-3-dodecene;
8-fluorotetracyclo(4.4.0.1$^{2,5}$.1$^{7,10}$)-3-dodecene;
8,9-dichlorotetracyclo(4.4.0.1$^{2,5}$.1$^{7,10}$)-3-dodecene;
8-cyclohexyltetracyclo(4.4.0.1$^{2,5}$.1$^{7,10}$)-3-dodecene;
8-isobutyltetracyclo(4.4.0.1$^{2,5}$.1$^{7,10}$)-3-dodecene;
8-butyltetracyclo(4.4.0.1$^{2,5}$.1$^{7,10}$)-3-dodecene;
8-ethylidenetetracyclo(4.4.0.1$^{2,5}$.1$^{7,10}$)-3-dodecene;
8-ethylidene-9-methyltetracyclo(4.4.0.1$^{2,5}$.1$^{7,10}$)-3-dodecene;
8-ethylidene-9-ethyltetracyclo(4.4.0.1$^{2,5}$.1$^{7,10}$)-3-dodecene;
8-ethylidene-9-isopropyltetracyclo(4.4.0.1$^{2,5}$.1$^{7,10}$)-3-dodecene;
8-ethylidene-9-butyltetracyclo(4.4.0.1$^{2,5}$.1$^{7,10}$)-3-dodecene;
8-n-propylidenetetracyclo(4.4.0.1$^{2,5}$.1$^{7,10}$)-3-dodecene;
8-n-propylidene-9-methyltetracyclo (4.4.0.1$^{2,5}$.1$^{7,10}$)-3-dodecene;
8-n-propylidene-9-ethyltetracyclo(4.4.0.1$^{2,5}$.1$^{7,10}$)-3-dodecene;
8-n-propylidene-9-isopropyltetracyclo (4.4.0.1$^{2,5}$.1$^{7,10}$)-3-dodecene;
8-n-propylidene-9-butyltetracyclo(4.4.0.1$^{2,5}$.1$^{7,10}$)-3-dodecene;
8-isopropylidenetetracyclo(4.4.0.1$^{2,5}$.1$^{7,10}$)-3-dodecene;
8-isopropylidene-9-methyltetracyclo(4.4.0.1$^{2,5}$.1$^{7,10}$)-3-dodecene;
8-isopropylidene-9-ethyltetracyclo(4.4.0.1$^{2,5}$.1$^{7,10}$)-3-dodecene;
8-isopropylidene-9-isopropyltetracyclo(4.4.0.1$^{2,5}$.1$^{7,10}$)-dodecene;
8-isopropylidene-9-butyltetracyclo(4.4.0.1$^{2,5}$.1$^{7,10}$)-3-dodecene;
hexacyclo(6.6.1.1$^{3,6}$.1$^{10,13}$.0$^{2,7}$.0$^{9,14}$)-4-heptadecene;
12-methylhexacyclo(6.6.1.1$^{3,6}$.1$^{10,13}$.0$^{2,7}$.0$^{9,14}$)-4-heptadecene;
12-ethylhexacyclo(6.6.1.1$^{3,6}$.1$^{10,13}$.0$^{2,7}$.0$^{9,14}$)-4-heptadecene;
12-isobutylhexacyclo(6.6.1.1$^{3,6}$.1$^{10,13}$.0$^{2,7}$.0$^{9,14}$)-4-heptadecene;
1,6,10-trimethyl-12-isobutylhexacyclo (6.6.1.1$^{3,6}$.1$^{10,13}$.0$^{2,7}$.0$^{9,14}$)-4-heptadecene;
octacyclo(8.8.0.1$^{2,9}$.1$^{4,7}$.1$^{11,18}$.1$^{13,16}$.0$^{3,8}$.0$^{12,17}$)-5-dococene;
15-methyloctacyclo(6.6.1.1$^{3,6}$.1$^{10,13}$.0$^{2,7}$.0$^{9,14}$)-5-dococene; and
15-ethyloctacyclo(6.6.1.1$^{3,6}$.1$^{10,13}$.0$^{2,7}$.0$^{9,14}$)-5-dococene.

Specific representative cyclic olefins according to formula 3 are as follows:
tricyclo(4.3.0.1$^{2,5}$)-3-decene;
2-methyltricyclo(4.3.0.1$^{2,5}$)-3-decene;
5-methyltricyclo(4.3.0.1$^{2,5}$)-3-decene;
tricyclo(4.3.0.1$^{2,5}$)-3-undecene;
10-methyltricyclo(4.3.0.1$^{2,5}$)-3-undecene;
pentacyclo(6.5.1.1$^{3,6}$.0$^{2,7}$.0$^{9,13}$)-4-pentadecene;
pentacyclo(4.7.0.1$^{2,5}$.0$^{8,13}$.1$^{9,12}$)-3-pentadecene;
methyl-substituted pentacyclo(4.7.0.1$^{2,5}$.0$^{8,13}$.1$^{9,12}$)-3-pentadecene;
1,3-dimethylpentacyclo(6.5.1.1$^{3,6}$.0$^{2,7}$.0$^{9,13}$)-4-pentadecene;
1,6-dimethylpentacyclo(6.5.1.1$^{3,6}$.0$^{2,7}$.0$^{9,13}$)-4-pentadecene;
14,15-dimethylpentacyclo(6.5.1.1$^{3,6}$.0$^{2,7}$.0$^{9,13}$)-4-pentadecene;
pentacyclo(6.6.1.1$^{3,6}$.0$^{2,7}$.0$^{9,14}$)-4-hexadecene;
1,3-dimethylpentacyclo(6.6.1.1$^{3,6}$.0$^{2,7}$.0$^{9,14}$)-4-hexadecene;
1,6-dimethylpentacyclo(6.6.1.1$^{3,6}$.0$^{2,7}$.0$^{9,14}$)-4-hexadecene;
15,16-dimethylpentacyclo(6.6.1.1$^{3,6}$.0$^{2,7}$.0$^{9,14}$)-4-hexadecene;
heptacyclo(8.7.0.1$^{2,9}$.1$^{4,7}$.1$^{11,17}$.0$^{3,8}$.0$^{2,16}$)-5-eicosene;
heptacyclo(7.8.0.1$^{3,6}$.0$^{2,7}$.1$^{10,17}$.0$^{11,16}$.1$^{12,13}$)-4-eicosene;
heptacyclo(8.8.0.1$^{2,9}$.1$^{4,7}$.1$^{11,18}$.0$^{3,8}$.0$^{12,17}$)-5-heneicosene; and
nonacyclo(9.10.1.1$^{4,7}$.0$^{3,8}$.0$^{2,18}$.0$^{12,21}$.1$^{13,20}$.0$^{14,19}$.1$^{15,18}$)-5-pentacosene.

In another embodiment, suitable cyclic olefins include cyclic and polycyclic non-conjugated dienes and trienes having a cyclized carbon-carbon double bond which is polymerizable. When the cyclic olefin is a cyclic diene or triene, the resulting copolymer can contain pendant cyclized double bonds which are potential sites for functionalization, hydrogenation, or other reactions. Specific representative examples of such cyclopolyenes include the following: ethylene norbornene; 5-vinyl-2-norbornene; 5-ethylidene-2-norbornene; dicyclopentadiene; tricyclopentadiene; 4-methylcyclo-1,4-octadiene; 4-methyl-5-propylcyclo-1,4-octadiene; 5-methylcyclopentadiene; 4-methyl-5-ethyldicyclopentadiene; 5-isopropyldicyclopentadiene; 1,5, 9-cyclododecatriene; 2-methyl-2,5-norbornadiene; 5-methyl-2,5-norbornadiene; 2-propyl-2,5-norbornadiene; 3-heptyl-2,5-norbornadiene; 2-ethyl-3-propyl-2,5- norbornadiene; 2-(1'5'-dimethylhexene-4yl)-2,5-norbornadiene; 2-ethylbicyclo(2.2.2)-2,5-octadiene; 2-methyl-3-ethyl-bicyclo(2.2.2)-2,5-octadiene; 2-hexylbicyclo(2.2.2)-2,5-octadiene; 2-(1',5'-dimethylhexenyl-4)bicyclo(2.2.2)-2,5-octadiene; 1-isopropylidenebicyclo(4.4.0)-2,6-decadiene; 3-ethylenebicyclo(3.2.0)-2,6-heptadiene; 3-methylbicyclo(3.3.0)-2,6-octadiene; pentacyclo(6.5.1.1$^{3,6}$.0$^{2,7}$.0$^{9,13}$)-4,10-pentadocadiene; 3-methyl-4,7,8,9-tetrahydroindene; 6-methyl-4,7,8,9-tetrahydroindene; and 2-propyl-4,7,8,9-tetrahydroindene.

Dicyclopentadiene or similar cyclic olefins or cyclopolyenes which may contain two or more structural isomers can be polymerized from either the endoform, the exo- form, or mixtures thereof. In another preferred embodiment, comonomers of exo-isomers are preferred over endo-isomers due to a preferential and more facile incorporation of the exo-isomer. Thus, a more facile incorporation allows for a wider range of compositions, which in turn translates into tackifier resins which have a broader range of adjustable properties. This flexibility is desirable in that it allows one to design tackifiers for a variety of adhesive formulations or applications.

The aromatic-group-containing monomer feed can be one or a mixture of suitable aromatic-group-containing monomers. Preferred aromatic-group-containing monomers that can be polymerized to produce tackifiers by this process contain up to 30 carbon atoms. Suitable aromatic-group-containing monomers comprise at least one aromatic structure, preferably from one to three, more preferably a phenyl, indenyl, fluorenyl, or naphthyl moiety. The aromatic-groupcontaining monomer further comprises at least one polymerizable double bond such that after polymerization, the aromatic structure will be pendant from the polymer backbone. Preferred aromatic-group-containing monomers contain at least one aromatic structure appended to a polymerizable olefinic moiety. The polymerizable olefinic moiety can be linear, branched, cyclic-containing, or a mixture of these structures. When the polymerizable olefinic moiety contains a cyclic structure, the cyclic structure and the aromatic structure can share 0, 1, or 2 carbons. The polymerizable olefinic moiety and/or the aromatic group can also have from one to all of the hydrogen atoms substituted with linear or branched alkyl groups containing from 1 to 4 carbon atoms. In one embodiment, the aromatic-group-containing comonomer is selected from Formulae 4 and 5 below:

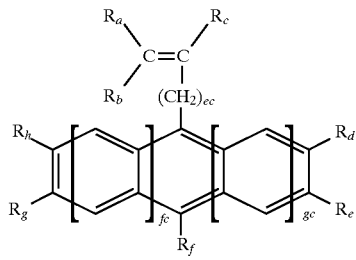
4.

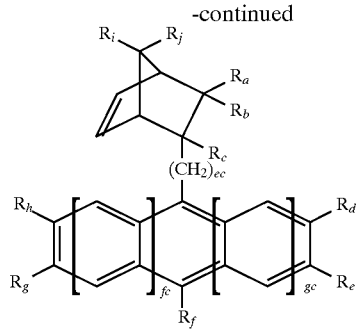
5.

wherein each $R_a$ through $R_j$ is independently hydrogen, a halogen, a hydrocarbyl, or a halohydrocarbyl, preferably hydrogen or hydrocarbyl; $R_a$ (or $R_b$) may be linked to $R_h$ directly; ec is an integer of from 0 to 30, fc and gc are independently integers of 0, 1, or 2. Preferred hydrocarbyls and halohydrocarbyls can be linear, cyclic, or branched and contain from 1 to 30 carbon atoms, preferably from 1 to 10 carbon atoms, more preferably from 1 to 4 carbon atoms.

Suitable aromatic comonomers according to formula 4 include: styrene; alpha-methylstyrene; vinyltoluenes; vinylnaphthalene; allylbenzene; and indene. Preferred aromatic comonomers are styrene and allyl benzene.

Suitable aromatic comonomers according to formula 5 can be prepared by the Diels-Alder reaction of cyclopentadiene or substituted cyclopentadienes with at least one aromatic comonomer given by formula 4 and include: 5-phenyl-2-norbornene; 5-methyl-5-phenyl-2-norbornene; 5-benzyl-2-norbornene; 5-toluyl--2norbornene; 5-naphthyl-2-norbornene; 1,4-methano-1,4,4a,9a,-tetrahydrofluorene; and 5-anthracyl-2-norbornene.

The above aromatic-group-containing monomers could be the endo- form, the exo- form, or mixtures thereof. Preferred aromatic comonomers according to formula 5 are 5-phenyl-2-norbornene, 5-methyl-5-phenyl-2-norbornene, 5-toluyl-2norbornene, and 1,4,-methano-1,4,4a,9a-tetrahydrofluorene. Other aromatic comonomers such as phenyltetracyclododecene can be prepared by Diels Alder reactions of the above mentioned aromatic monomers with an additional molar equivalent of a cyclopentadiene monomer.

Catalyst Systems

Preferred catalysts of the invention, for example, are typically those bulky ligand transition metal complexes derivable from the formula:

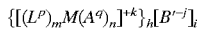

where L is a bulky ligand bonded to M, p is the anionic charge of L and m is the number of L ligands and m is 1, 2 or 3; A is a ligand bonded to M and capable of inserting an olefin between the M—A bond, q is the anionic charge of A and n is the number of A ligands and n is 1, 2, 3 or 4, M is a metal, preferably a transition metal, and (p×m)+(q×n)+k corresponds to the formal oxidation state of the metal center; where k is the charge on the cation and k is 1, 2, 3 or 4, and B' is a chemically stable, non-nucleophilic anionic complex, preferably having a molecular diameter of 4 Å or greater and j is the anionic charge on B', h is the number of cations of charge k, and i the number of anions of charge j such that h×k=j×i.

Any two L and/or A ligands may be bridged to each other. The catalyst compound may be full-sandwich compounds having two or more ligands L, which may be cyclopentadienyl ligands or substituted cyclopentadienyl ligands, or halfsandwich compounds having one ligand L, which is a cyclopentadienyl ligand or heteroatom substituted cyclopentadienyl ligand or hydrocarbyl substituted cyclopentadienyl ligand such as an indenyl ligand, a benzoindenyl ligand or a fluorenyl ligand and the like or any other ligand capable of $\eta^5$ bonding to a transition metal atom. Such cyclopentadienyl ligands typically contain 5-member rings, each member being carbon, but any group 14 or 15 element can replace one or more of the ring carbon atoms. One or more of these bulky ligands is i-bonded to the transition metal atom. Each L can be substituted with a combination of substituents, which can be the same or different. Non-limiting examples of substituents include hydrogen or a linear, branched or cyclic alkyl, alkenyl or aryl radical or combination thereof having from 1 to 30 carbon atoms. The substituent can also be substituted with hydrogen or a linear, branched or cyclic aLkyl, alkenyl or aryl radical having from 1 to 30 carbon atoms. L may also be other types of bulky ligands including but not limited to bulky amides, phosphides, alkoxides, aryloxides, imides, carbolides, borollides, porphyrins, phthalocyanines, corrins and other polyazomacrocycles. The metal atom may be a Group 4, 5 or 6 transition metal or a metal from the lanthanide and actinide series, preferably the transition metal is of Group 4. Other ligands may be bonded to the transition metal, such as a leaving group, such as but not limited to weak bases such amines, phosphines, ether and the like. In addition to the transition metal, these ligands may be optionally bonded to A or L. Non-limiting examples of catalyst components and catalyst systems are discussed in for example, U.S. Pat. Nos. 4,530,914, 4,871,705, 4,937, 299, 5,124,418, 5,017,714, 5,120,867, 5,278,264, 5,278,119, 5,304,614, 5,324,800, 5,347,025, 5,350,723, 5,198,401, 5,384,299, 5,391,790 and 5,391,789 all of which are herein fully incorporated by reference. Also, the disclosures of EP-A-0 591 756, EP-A-0 520 732, EP-A-0 420 436, WO 91/04257, WO 92/00333, WO 93/08221, WO 93/08199 and WO 94/01471 are all fully incorporated herein by reference.

In one embodiment, the activated catalyst of the invention is formed from a catalyst compound represented by the general formula:

$(L^p)_m M(A^q)_n (E^r)_o$ where L, M, A, and p, m, q and n are as defined above and E is an anionic leaving group such as but not limited to hydrocarbyl, hydrogen, halide, silyl, or any other anionic ligand; r is the anionic charge of E and o is the number of E ligands and o is 1, 2, 3 or 4 such that $(p \times m)+(q \times n)+(r \times o)$ is equal to the formal oxidation state of the metal center, and an aluminum alkyl, alumoxane, modified alumoxane or any other oxy-containing organometallic compound or non-coordinating ionic activators, or a combination thereof.

In another embodiment, the catalyst component of the invention includes monocyclopentadienyl heteroatom containing compounds. This heteroatom is activated by either an alumoxane, modified alumoxane, a non-coordinating ionic activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096, 867, 5,055,438, 5,227,440 and 5,264,405 and EP-A-0 420 436, all of which are fully incorporated herein by reference. Additionally it is within the scope of this invention that the metallocene catalysts and catalyst systems may be those described in U.S. Pat. Nos. 5,064,802, 5,145,819, 5,149,819, 5,243,001, 5,239,022, 5,276,208, 5,296,434, 5,321,106, 5,329,031 and 5,304,614, PCT publications WO 93/08221, WO 93/08199 and WO 95/07140 and EP-A-0 578 838, EP-A-0 638 595 all of which are herein incorporated by reference.

The preferred transition metal component of the catalyst of the invention are those of Group 4, particularly, titanium, zirconium and hafnium. The transition metal may be in any formal oxidation state, preferably +2, +3 or +4 or a mixture thereof, preferably +4.

In another embodiment the catalyst component is represented by one of the formula (I):

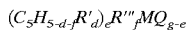

wherein M is a Group 4, 5, 6 transition metal, at least one $(C_5H_{5-d-f}R'_d)$ is an unsubstituted or substituted cyclopentadienyl ligand bonded to M; each R", which can be the same or different is hydrogen or a substituted or unsubstituted hydrocarbyl having from 1 to 30 carbon atoms or combinations thereof or two or more carbon atoms are joined together to form a part of a substituted or unsubstituted ring or ring system having 4 to 30 carbon atoms; R''' is a radical containing one or more of carbon, germanium, silicon, phosphorous, or nitrogen atoms or a combination therof, and bridging two $(C_5H_{5-d-f}R''_d)$ rings or bridging one $(C_5H_{5-d-f}R''_d)$ ring to M; each Q, which can be the same or different, is a hydride, substituted or unsubstituted hydrocarbyl having from 1 to 30 carbon atoms, halogen, aLkoxides, aryloxides, amides, phosphides or any other univalent anionic ligand or combination thereof; two Q can be an alkylidene ligand or cyclometallated hydrocarbyl ligand or other divalent anion chelating ligand having from 1 to 30 carbon atoms, where g is an integer corresponding to the formal oxidation state of M, d is 0, 1, 2, 3, 4 or 5, f is 0 or 1, and e is 1, 2 or 3.

In another preferred embodiment of this invention the catalyst component is represented by the formula (II):

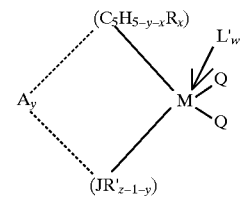

wherein M is Ti, Zr or Hf; $(C_5H_{5-y-x}R_x)$ is a cyclopentadienyl ring which is substituted with from 0 to 5 substituent groups R, "x" is 0, 1, 2, 3, 4 or 5 denoting the degree of substitution, and each substituent group R is, independently, a radical selected from a group consisting of $C_1$–$C_{20}$ hydrocarbyl radicals, substituted $C_1$–$C_{20}$ hydrocarbyl radicals wherein one or more hydrogen atoms is replaced by a halogen atom, $C_1$–$C_{20}$ hydrocarbyl-substituted metalloid radicals wherein the metalloid is selected from the Group 14 of the Periodic Table of Elements, and halogen radicals or $(C_5H_{5-y-x}R_x)$ is a cyclopentadienyl ring in which two adjacent R-groups are joined forming $C_4$–$C_{20}$ ring to give a saturated or unsaturated polycyclic cyclopentadienyl ligand such as indenyl, tetrahydroindenyl, fluorenyl, or octahydrofluorenyl;

$(JR'_{z-1-y})$ is a heteroatom ligand in which J is an element with a coordination number of three from Group 15 or an element with a coordination number of two from Group 16 of the Periodic Table of Elements, preferably nitrogen, phosphorus, oxygen or sulfur with nitrogen being preferred, and each R' is, independently, a radical selected from a group consisting of $C_1$–$C_{20}$ hydrocarbyl radicals wherein one or more hydrogen atoms is replaced by a halogen atom, y is 0 or 1, and "z" is the coordination number of the element J;

each Q is, independently, any univalent anionic ligand such as halogen, hydride, or substituted or unsubstituted $C_1$–$C_{30}$ hydrocarbyl, alkoxide, aryloxide, amide or phosphide, provided that two Q may be an alkylidene, a cyclometallated hydrocarbyl or any other divalent anionic chelating ligand;

A is a covalent bridging group containing a Group 15 or 14 element such as, but not limited to, a dialkyl, alkylaryl or diaryl silicon or germanium radical, alkyl or aryl phosphine or amine radical, or a hydrocarbyl radical such as methylene, ethylene and the like;

L' is a Lewis base such as diethylether, tetraethylammonium chloride, tetrahydrofuran, dimethylaniine, aniline, trimethylphosphine, n-butylamine, and the like; and w is a number from 0 to 3. Additionally, L' may be bonded to any of R, R' or Q.

For purposes of this patent specification and appended claims all the transition metal compounds or catalyst components described above are generally referred to as "metallocenes". "Metallocene catalyst system" refers to the combination of at least one cyclopentadienyl transition metal compound and at least one activator.

Preferred metallocene catalyst systems are based on group 4 and 5 transition metal compound; more preferably titanium, zirconium, or hafnium. Titanium is particularly preferred for metallocenes containing one substituted or unsubstituted cyclopentadienyl ligand. Zirconium is particularly preferred for metallocenes containing more than one substituted or unsubstituted cyclopentadienyl ligand. Preferred ligand structures in metallocene catalyst systems include cyclopentadienyl, indenyl, tetrahydroindenyl, fluorenyl, and amido ligands. Particularly preferred metallocene catalysts have the following ligand structural combinations: unbridged bis-cyclopentadienyl; silicon bridged bis-indenyl; silicon bridged cyclopentadienyl amido; carbon bridged cyclopentadienyl fluorenyl; carbon bridged bis-cyclopentadienyl; and carbon bridged cyclopentadienyl indenyl. Non-limiting examples of each of these classes of catalyst are shown below;

dimethyl bis(1-methyl-3-n-butyl-cyclopentadienyl) zirconium;
dimethyl bis(cyclopentadienyl) zirconium;
rac-dimethyl dimethylsilanyl bis(tetrahydroindenyl) zirconium;
dimethyl dimethylsilanyl bis(indenyl) hafnium;
dimethyl dimethylsilanyl bis[(tetramethylcyclopentadienyl)(dodecyl-amino)] titanium;
dimethyl[(methyl)(phenyl)methylene(1-cyclopentadienyl)(9-fluorenyl)] zirconium;
dimethyl isopropylidene[(1-cyclopentadienyl)(9-fluorenyl)] zirconium;
dimethyl methylene bis(cyclopentadienyl) zirconium;
dimethyl isopropylidene bis(cyclopentadienyl) zirconium;
dimethyl methylene (cyclopentadienyl indenyl) zirconium; and
dimethyl diphenyl methylene bis (cyclopentadienyl) zirconium.

Without wishing to be bound to any particular theory, it is generally believed that catalyst activity and ability to incorporate bulky comonomers is improved by increasing the metallocene coordination aperature or wedge between the cyclopentadienyl ligands, thus allowing easier access to the active metal center. For additional information on metallocene catalysts and preparation of catalysts favoring incorporation into the polymer of buLky monomers, see, for example, Kaminsky, et al., *A Tailor-Made Metallocene for the Copolymerization of Ethene with Bulky Cycloalkenes,* Agnew. Chem. Int. Ed. Engl., p. 2273–2275 1995, 34, No. 20; Brintzinger, et al., *Stereospecific Olefin Polymerization with Chiral Metallocene Catalysts,* Agnew. Chem. Int. Ed. Engl., p. 1143–1170, 1995, 34; Kaminsky, et al., *Copolymerization of Norbornene and Ethene with Homogenous Zirconocenes/Methylalumoxane Catalysts,* 31 Polymer Bulletin 175–183 (1993); and Willoughby, et al., *Preparation and X-ray structure of a Novel Chiral Methylene Bridged Titanocene Complex,* 497 Journal of Organometallic Chemistry, 11–15 (1995), all of which are fully incorporated herein by reference for purposes of U.S. patent practice. Methods that are known to increase the wedge space include bridging the cyclopentadienyl ligands and decreasing the steric bulk on the cyclopentadienyl ligands. Shorter bridges such as dimethylmethylene and diphenylmethylene are preferred over silanyl bridges, which are in turn preferred over unbridged which are in turn preferred over longer ethylene bridges. The angle formed at the metal center between the centroids of the π-bonded cyclopentadienyl moieties is often used in part to describe the geometry or steric relationships of metallocenes. A decrease in this angle results in a wider coordination space, which typically translates into higher catalyst activities and/or higher incorporation rates of cyclics relative to alpha olefins. It should be noted, however, that stereoelectronic or purely electronic effects may also play an important or even primary role in determining activity and ability to incorporate bulky comonomers in some instances.

In another embodiment, the methyl groups attached to the transition metal are replaced by halide atoms, such as chlorine, and the resulting dichloride catalysts are activated with an alumoxane, such as methylalumoxane.

For the purposes of this patent specification and appended claims, the terms "cocatalysts" and "activators" are used interchangeably and are defined to be any compound or component which can activate a metallocene compound, as defined above. For example, a Lewis acid, a non-coordinating ionic activator, an ionizing activator, or any other compound that can convert a metallocene catalyst component to a catalytically active metallocene cation is an activator or cocatalyst. It is within the scope of this invention to use, as an activator for one or more metallocenes, alumoxane and/or to also use ionizing activators, neutral or ionic, such as tri(n-butyl)ammonium tetrakis (pentafluorophenyl) boron or a trisperfluorophenyl boron metalloid precursor which ionize the neutral metallocene compound. Dimethylanilinium tetrakis(pentafluorophenyl) boron is a particularly preferred activator for the above named metallocenes.

There are a variety of methods for preparing alumoxane and modified alumoxanes, non-limiting examples of which are described in U.S. Pat. No. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529 and EP-A-0 561 476, EP-B1-0 279 586, EP-A-0 594-218 and WO 94/10180, all of which are fully incorporated herein by reference.

Ionizing compounds may contain an active proton, or some other cation associated with but not coordinated or only loosely coordinated to the remaining ion of the ionizing compound. Such compounds and the like are described in EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568 and 5,384,299 are all herein fully incorporated by reference.

Processes have been developed to utilize poison scavenging compounds, for example alkyl aluminum's or alumoxanes, for solution polymerization and to remove or neutralize polar groups retained in or on metal oxide supports. Lewis acids such as trialkyl organo aluminum or boron compounds are effective, as are their hydrolized derivatives, e.g., triethyl aluminum, tri(n-octyl)aluminum, trisobutyl aluminum, and the like. See, for example, U.S. Pat. Nos. 5,153,157 and 5,241,025, describing Group-IIA metal scavenger compounds and processes, including supported catalyst processes, and WO-A-91/09882, WO-A-94/00500, WO-A-94/03506, and WO-A-94/07928 describing supporting techniques utilizing similar compounds. U.S. Pat. No. 5,427,991, equivalent WO-A-93/11172, and co-pending U.S. Ser. No. 08/474,948, filed Jun. 7, 1995, describe the chemical bonding of anionic activators to polymeric and metal oxide supports so as to prepare chemically bound, supported polyanionic activators.

In one embodiment of the invention two or more metallocenes as described above can be combined to form a catalyst system useful in the invention. For example, those mixed catalysts described in U.S. Pat. Nos. 5,281,679 and 5,466,649, both of which are fully incorporated herein by reference. In another embodiment of the catalyst system of the invention combinations of one or more of catalyst components of general formula (I) and/or (II) are contemplated. In one embodiment, metallocene catalyst components can be combined to form the blend compositions as described in PCT publication WO 90/03414 published Apr. 5, 1990, fully incorporated herein by reference. In yet another embodiment, mixed metallocenes as described in U.S. Pat. Nos. 4,937,299 and 4,935,474, both are herein fully incorporated herein by reference, can be used to produce polymers having a broad molecular weight distribution and/or a multimodal molecular weight distribution.

In another embodiment of the invention at least one metallocene catalyst can be combined with a non-metallocene or traditional Ziegler-Natta catalyst or catalyst system, non-limiting examples are described in U.S. Pat. Nos. 4,701,432, 5,124,418, 5,077,255, 5,183,867, 5,391,660 and 5,395,810, all of which are incorporated herein by reference.

For purposes of this patent specification the terms "carrier" or "support" are interchangeable and can be any support material, preferably a porous support material, such as for example, talc, inorganic oxides, inorganic chlorides, for example magnesium chloride, and resinous support materials such as polystyrene or polystyrene divinyl benzene polyolefins or polymeric compounds or any other organic or inorganic support material and the like, or mixtures thereof.

Preferred support materials are inorganic oxide materials, which include those of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination are silica, alumina or silica-alumina and magnesia, titania, zirconia, and the like.

The catalyst system of the invention can be made in a variety of different ways as previously described. In one embodiment the catalyst is unsupported, see U.S. Pat. No. 5,317,036 and EP-A-0 593 083 incorporated herein by reference. In a preferred embodiment, the catalyst system of the invention is supported. Examples of supporting the catalyst system used in the invention are described in U.S. Pat. Nos. 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, 5,346,925 and 5,466,649, and U.S. patent application Ser. Nos. 08/433,768, filed May 3, 1995, 08/403,544, filed Mar. 14, 1995, 08/417,484, filed Apr. 5, 1995, 08/412,810, filed Mar. 29, 1995, 08/413,140, filed Mar. 29, 1995, 08/271,598, filed Jul. 7, 1994, 08/495,770, filed Jun. 27, 1995, and WO 91/09882 and copending 08/474,948, filed Jun. 7, 1995, all of which are herein fully incorporated by reference for purposes of U.S. patent practice.

In one embodiment of the process of the invention, olefin(s) are prepolymerized in the presence of the catalyst or catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833, 5,283,278 and 4,921,825 and EP-B-0 279 863, all of which are herein fully incorporated by reference.

In another embodiment of the invention, the supported catalyst system of the invention includes an antistatic agent or surface modifier, for example, those described in U.S. Pat. No. 5,283,278 and U.S. patent application Ser. No. 08/322,675, filed Oct. 13, 1994, which are fully incorporated herein by reference. Non-limiting examples of antistatic agents and surface modifiers include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention, however, it is preferred that it is added after the supported catalyst system of the invention is formed, in either a slurry or dried state.

In another embodiment, the resins of this invention can be produced using a palladium or nickel catalyst as disclosed in "New Pd(II)- and Ni(II)-Based Catalysts for Polymerization of Ethylene and $\alpha$-Olefins," Johnson, Killian, and Brookhart, *J. Am. Chem Soc.* 1995, 117, pp. 6414–6415.

The mole ratio of the metal of the activator component to the transition metal of the metallocene component is in the range of ratios between 0.3:1 to 1000:1, preferably 20:1 to 800:1, and most preferably 50:1 to 500:1. Where the activator is an aluminum free ionizing activator such as those based on the anion tetrakis(pentafluorophenyl)boron as previously described, the mole ratio of the metal of the activator component to the transition metal component is preferably in the range of ratios between 0.3:1 to 3:1.

In another embodiment the catalyst loading in millimoles (mmoles) of metallocene to weight of support material in grams (g) is in the range of from about 0.001 to about 2.0 mmoles of metallocene per g of support material, preferably from about 0.005 to about 1.0, more preferably from about 0.005 to 0.5 and most preferably from about 0.01 to 0.15.

All references to the Periodic Table are to the table as published in Hawley's Condensed Chemical Dictionary, 11th ed., Sax & Lewis, 1987.

Process Conditions

The tackifier resins of this invention are produced using metallocene catalyst systems in a polymerization or copolymerization process in gas, slurry, solution, bulk, or high pressure processes, preferably in solution process.

In a solution process, the catalyst components and the monomers are typically suspended or dissolved in a solvent and introduced into a stirred reaction vessel. Reaction temperatures may range from $-100°$ C. to $250°$ C. Preferred temperatures range from $0°$ C. to $250°$ C., preferably $20°$ C. to $220°$ C., preferably $55°$ C. to $175°$ C., even more preferably $60°$ C. to $120°$ C., most preferably $75°$ C. to $110°$ C. Preferred pressures for the polymerization process are less than or equal to 3,000 bar (300 MPa), more preferably less than or equal to 2,000 bar (200 MPa), and even more preferably range from about atmospheric pressure to about 275 bar (28 MPa). The instant processes typically run according to solution protocols known to those of ordinary skill in the art. Preferred hydrocarbon solvents include but are not limited to aliphatics, paraffinics, cyclo-aliphatics, aromatics, and the like. Examples of useful solvents include hexane, 2-methyl-pentane, isopentane, Isopar™ (hydrocarbon solvents available from Exxon Chemical Company), benzene, toluene, and the like. In addition the polymerization can be performed without solvent, such as in bulk polymerizations using standard techniques known in the art.

To obtain tackifiers from the polymerization catalyst systems and conditions described above, one will select conditions that will produce low molecular weight and preferably high comonomer incorporation. Conditions that will produce low molecular weight, while holding other process variables substantially constant, include: increasing reaction temperatures to increase the incidence of chain transfer or chain termination; introducing chain transfer agents, such as hydrogen or other known coordination polymerization chain termination agents; increasing the amount of cyclic comonomer in the feed, increasing the catalyst concentration, or employing monomers that are capable of readily undergoing beta-hydride or beta-alkyl elimination (e.g., propylene or higher alphaolefins). Selection of catalyst and activation compound may also be utilized, for example, bis(cyclopentadienyl) derivatives of zirconium with the multi-boron activators of U.S. Pat. No. 5,278,119, optionally operated at temperatures above 60° C. with or without chain transfer agents may be effectively used. The use of mixed or different solvents may also have pronounced molecular weight effects. Copolymerizations run in hexane tend to give lower molecular weight resins than those run in toluene when using dimethyl bis (cyclopentadienyl) zirconium as a catalyst as shown by Example 1 versus Example 12 and Example 3 versus Example 15 in Tables 1 and 2.

In the practice of this invention one of ordinary skill in the art can also use conditions known to promote high comonomer incorporation including but not limited to increasing the comonomer feed into the reactor. For example, in the absence of comonomer, dimethyl dimethylsilanyl bis (tetrahydroindenyl) zirconium, when activated with an equimolar amount of a non-coordinating anion such as dimethylaninium tetrakis(pentafluorophenyl) boron produces relatively high molecular weight, stereoregular polypropylene that has a well defined melting transition. In contrast, if one introduces a mixture of polypropylene and cyclic comonomer (approximately 2:1 to 2.6:1 on a molar basis as in Examples 13, 16, 17, 22, 25–27 34–39, and Q in Tables 1 and 2) into the polymerization reactor at 80°–90° C., the product is a low molecular weight, amorphous resin containing 30–40 mole percent comonomer that exhibits a glass transition temperature but lacks a well-defined melting point. In contrast, if a catalyst known to produce amorphous polymer and incorporate high levels of comonomer is selected, then the amount of cyclic comonomer in the feed could be decreased and one of ordinary skill in the art would use methods such as increasing the reaction temperature, optionally in conjunction with hydrogen, to produce the desired low $M_n$ high $T_g$ polymer. As one can surmise depending on the catalyst and polymerization conditions, a variety of polymers can be produced that have low $M_n$ and high $T_g$.

Monomer feed for the polymerization preferably contains from 0.1 to 10 moles of alpha-olefin to every mole of cyclic comonomer feed and from 0.1 to 10 moles of aromatic-group-containing monomer to every mole of cyclic comonomer feed.

Tackifier Resin

A tackifier resin as described in this application is a hydrocarbon copolymer that when blended with a base polymer will have the effect of producing an adhesive blend that has a lower $M_n$, higher $T_g$, and lower viscosity than the unblended base polymer. For block copolymers having multiple phases and hence multiple $T_g$'s, a tackifier will associate with and increase the $T_g$ of at least one phase. A tackifier resin will have the further effect of improving one or more adhesive performance attributes over that of the base polymer, particularly having the effect of improving the balance of properties such as adhesion (eg. 180° peel), cohesion (e.g. SAFT), and color (e.g. Saybolt). A base polymer may be a single polymer or a blend of two or more polymers, but each component of the base polymer blend preferably has individually an $M_n$ greater than 10,000, preferably greater than 30,000, more preferably greater than 50,000, even more preferably greater than 80,000.

In a preferred embodiment, for use as a tackifier in adhesive compositions, the resin is amorphous. "Amorphous" is defined to be a substantially non-crystalline and lacking a defined melting point or melting transition. "Substantially non-crystalline" is defined as containing about 10% crystallinity or less as measured by DSC, X-ray diffraction, or other methods known to those skilled in the art. DSC, for purposes of this invention, is the determinative technique in cases where different methods yield different crystallinity values. In another preferred embodiment the tackifier resin is compatible with the base polymer to be tackified. Compatible as used herein means that the tackifier will associate or interdiffuse with at least one phase of the base polymer to be tackified such that the tackified phase exhibits a single higher $T_g$ than prior to tackification.

The resins of this invention can range from viscous liquids to brittle solids, but for use as a tackifier in adhesive compositions will preferably have a number average molecular weight ($M_n$) of less than about 2,000, preferably below about 1,600, more preferably below about 1,200, even more preferably below about 1,000, even more preferably in the range of from about 200 to about 800, most preferably in the range of from about 300 to about 600.

Metallocene-produced polymers of alpha-olefins, cyclic olefins, and aromatic-group-containing monomers can range from low $M_n$ oligomers up to an $M_n$ of 100,000 or more, but for use as a tackifier in adhesive compositions will preferably have a $T_g$ greater than or equal to about 0° C. to less than about 100° C., more preferably greater than or equal to about 20° C. to less than about 85° C., even more preferably from about 30° C. to about 80° C., even more preferably from greater than 30° C. to about 65° C.

For use as a tackifier, the resins produced herein preferably have about 0.5 mole percent or more incorporation of alpha-olefins more preferably in the range of from about 1 mole percent to about 90 mole percent, even more preferably in the range of from about 5 mole percent to about 85 mole percent, even more preferably from about 10 mole percent to about 80 mole percent, most preferably from about 15 mole percent to about 75 mole percent. When ethylene is present as an alpha-olefin, it is preferable that at least one other $C_3$ or higher alpha olefin monomer is present in an amount such that the total molar amount of the one or more $C_3$ or higher alpha-olefins equals or exceeds the molar amount of ethylene.

For use as a tackifier, resins produced herein preferably have about 5 mole percent or more incorporation of cyclic olefins, more preferably in the range of from about 10 mole percent to about 90 mole percent, even more preferably in the range of from about 5 mole percent to about 85 mole percent, even more preferably from about 10 mole percent to about 80 mole percent, even more preferably from about 15 mole percent to about 75 mole percent, most preferably from greater than 20 mole percent to 75 mole percent.

Preferably, greater than 90%, more preferably 95%, even more preferably 100%, of the cyclic olefins incorporated into the polymer chains will retain their original ring structures. Of the cyclic structures that are incorporated into the polymer backbone, preferably at least 95%, more preferably 99%, even more preferably 100% will be incorporated by 1, 2 syn addition, or in other words, only the two carbons of the polymerized olefinic unsaturation will become a part of the polymer backbone. In the metallocene catalyzed polymerization of bicyclics such as norbornene and dicyclopentadiene, as in the present invention, the cyclic monomer is incorporated into the polymer chain via a 1,2 syn addition across the exo face at the 2,3-position (see, for example, Kaminsky, et al., New Polymers by Homogeneous Zirconocene/Aluminoxane Catalysts, Makromol. Chem., Macromol. Symp., p.83–93, 1991, 47; Benedikt, et al., Polymerization of Multicyclic Monomers Using Zirconocene Catalyst, New J. Chem., p. 105–114, 1994, 18, both of which are fully incorporated herein by reference for purposes of U.S. patent practice). In contrast, the polymerization of norbornenes or dicyclopentadiene using Friedel-Crafts type catalysts such as $BF_3$ etherate involves free carbocations resulting in bond rearrangements and predominately a 2,7-enchainment of the cyclic structure (see for example, Mehler, Addition Polymerization of Norborne Catalyzed by Palladium (2+) Compounds, Macromolecules, p. 4226–4228, 1992, 25 and Gaylord, et al., Poly-2,3- and 2,7-Bicyclo[2.2.1]hept-2-enes: Preparation and Structures of Polynorbornenes, J. Macromol. Sci., Chem., p. 1053, 1977, A11., both of which are fully incorporated herein by reference for purposes of U.S. patent practice). Furthermore, in the case of dicyclopentadiene, the five-membered cyclopentene ring also participates in the reaction. $^1$H NMR data for polymers of the present invention provide proof that no rearrangement of the original ring structure occurs and that the five-membered ring of dicyclopentadiene remains intact.

For use as a tackifier, the resins produced herein preferably have about 0.5 mole percent or more incorporation of aromatic-group-containing monomers, more preferably in the range of from about 0.75 mole percent to about 90 mole percent, even more preferably in the range of from about 1 mole percent to about 50 mole percent, even more preferably from about 1 mole percent to about 20 mole percent, even more preferably from about 1 mole percent to about 15 mole percent, even more preferably from about 1 mole percent to about 10 mole percent, most preferably from about 1 mole percent to about 5 mole percent. In a preferred embodiment, the mole percent aromatic-group-containing monomer is less than the mole percent cyclic monomer content.

In another embodiment, the aromatic-group-containing monomer is distributed randomly along the polymer chain. In yet another embodiment, the aromatic monomer is incorporated preferentially at the chain end. Information regarding the incorporation of aromatic monomers such as styrene and allylbenzene can be obtained from proton nuclear magnetic resonance data by comparing the integral for the aromatic protons with the olefinic protons resonating at 6.1 and 6.3 ppm, which are assigned to chain end structures resulting from secondary insertion of the aromatic monomer followed by beta-hydride elimination. A ratio of 5:2 (aromatic:olefinic) indicates all of the incorporated styrene or allylbenzene is incorporated at the chain end. Higher ratios indicate that the aromatic monomer is incorporated along the chain as well as at the end of the chain. The absence of olefinic signals attributed to aromatic end groups indicates that the aromatic monomer is distributed randomly along the chain. Resins prepared using dimethyl bis (cyclopentadienyl) zirconium tend to give higher ratios compared to resins catalyzed by dimethyl[dimethylsilanyl bis(tetrahydroindenyl) zirconium.

For use as a tackifier in adhesive compositions, the resins produced herein preferably have an $M_w/M_n$ of 3 or less, preferably 2.5 or less, even more preferably in the range of from 2.5 to 1.

Furthermore, in a preferred embodiment these resins have low color that cannot be accurately measured on the Gardner scale which is typically used to measure the color of traditional tackifiers. Tackifiers produced according to this invention preferably have Saybolt colors of about 15 or higher, preferably about 18 or higher, more preferably about 20 or higher, even more preferably about 25 or higher, most preferably about 28 or higher.

Adhesive Compositions

Resins of this invention having a low $M_n$ and high $T_g$ can be combined with base polymers to produce adhesive compositions. A base polymer can be plastics, thermoplastics, elastomers, plastomers, or combinations thereof. Preferred base polymers include random copolymers, homopolymers, block copolymers and mixtures thereof. Preferred adhesive compositions comprising the resins of this invention include hot melt adhesives, pressure sensitive adhesives, hot melt pressure sensitive adhesives, contact adhesives, and the like. In addition, to the base polymer and tackifier, other additives may be present in the adhesive compositions. Typical additives include, dyes, pigments, fillers, waxes, plasticizers, anti-oxidants, heat stabilizers, light stabilizers, additional tackifiers and the like.

In one embodiment, the base polymer is at least one random copolymer. Preferred random copolymers include co-, ter- or tetra-polymers of olefins such as, ethylene, alpha-olefins, acrylics, acrylates, acetates, and the like. Preferred alpha-olefins contain 2 to 20 carbon atoms, more preferably 2 to 8, even or more preferably 2 to 6. Examples of useful ethylene alpha-olefin copolymers include ethylene/hexene-1, ethylene/butene-1, ethylene/4-methyl-pentene-1, ethylene/octene-1 copolymers and the like. Preferred ethylene-alpha-olefin or propylene-alpha-olefin base polymers are produced with metallocene catalyst systems. Preferred polar comonomers for polymerization with alpha olefins, especially ethylene, include vinyl acids, vinyl esters, vinyl alcohols, such as ethacrylic acid, crotonic acid, vinyl acetic acid, angelic acid, maleic acid, fumaric acid, ketones, carbon monoxide, 2-hydroxy ethyl acrylate, 2-hydroxy ethyl methacrylate, and the like. Preferred examples include alkylmethacrylates, alkylacrylates, alkylmethacrylic acids, and alkylacrylic acids. Even more preferable examples of suitable monomers include vinyl acetate, acrylic acid, methacrylic acid, methacrylate, ethyl methacrylate, methyl methacrylate, ethyl acrylate, and methyl acrylate. Other typical random copolymers which can be combined with the tackifiers produced herein also include but are not limited to ethylene-propylene rubber, ethylene-propylene-diene terpolymer rubber, silicone, butyl rubber, copolymers of isobutylene, and isoolefin-paraalkyl-styrene copolymers, particularly isobutylene-co-paramethyl-styrene. Preferred copolymers possess a degree of crystallinity of at least 5 weight percent, preferably at least 15 weight percent, more preferably at least 20 weight percent, as measured by DSC.

In another embodiment, the base polymer is at least one homopolymer. Preferred homopolymers to be combined with the new tackifer resins include but are not limited to polyethylene, polypropylene, polyvinyl chloride, natural rubber, polyisoporene, nitrile rubber, polychloroprene rubber, polyisobutylene elastomers, polyurethane, polybutadiene, and polystyrene. Preferred homopolymers possess a degree of crystallinity of at least 5 weight percent, preferably at least 15 weight percent, more preferably at least 20 weight percent, as measured by DSC.

In another embodiment, the base copolymer is at least one block copolymer. One class of preferred block copolymers to be blended with the new tackfiers are those based on styrene, particularly block, di-block, multi-block, multi-arm and star-block copolymers. Preferred polymers are those comprising styrenic blocks and diene blocks in an A-(B-A)$_n$-B-A, A-(B-A)$_n$-B, or (A)$_n$B configuration where n=0, 1, 2, 3, or 4. "A" is preferably a poly(styrene) or a poly (substituted styrene) block. The A monomers preferably constitute from about 10 to about 55 weight percent of the block copolymer, more preferably from about 15 to about 50 weight percent, even more preferably from about 18 to about 45 weight percent. B is preferably a polymer of a $C_3$ to $C_{30}$ diene, preferably isoprene and/or butadiene. Such polymers are commercially available under the trade names KRATON 1107™, KRATON 1101™, VECTOR 4111™ and VECTOR 4411™, VECTOR 4461™. Other grades of KRATON™ and VECTOR™ polymers are also useful for blending with the tackifiers produced herein. (KRATON™ and VECTOR™ polymers are available from Shell Chemical Company, Houston, Tex., and DEXCO Polymers, Houston, Tex., respectively.)

In another embodiment, a block copolymer is used as the base polymer, preferably to form a pressure sensitive adhesive (PSA). The block copolymer is preferably present in the range of from about 10 weight percent to about 90 weight percent, more preferably from about 20 weight percent to about 80 weight percent, most preferably from about 30 weight percent to about 70 weight percent, based upon the total weight of the adhesive composition. The tackifier is preferably present in the range of from about 10 weight percent to about 90 weight percent, more preferably from about 20 weight percent to about 80 weight percent, even more preferably from about 30 weight percent to about 70 weight percent, most preferably from about 40 weight percent to about 60 weight percent, based upon the total weight of the adhesive composition. In addition to the base polymer and tackifier, PSAs typically include other additives. Typical additives for adhesives include, dyes, pigments, fillers, waxes, plasticizers, anti-oxidants, heat stabilizers, light stabilizers, additional tackifiers, and the like. The total amount of all additives is preferably in the range of from 0 weight percent to about 50 weight percent, more preferably from about 0.5 weight percent to about 40 weight percent, even more preferably from about 1 weight percent to about 30 weight percent, most preferably from about 5 weight percent to about 15 weight percent, based upon the total weight of the adhesive composition. Preferred resins for this embodiment are terpolymers and more preferably comprise propylene as the alpha-olefin, dicyclopentadiene or norbomene as the cyclic olefin, and styrene or allyl benzene as the aromatic-group-containing monomer.

The components of the pressure sensitive adhesive composition can be blended by ordinary methods known in the art for such as melt blending, extruder blending, or blending in solution.

In another embodiment, at least one of a random copolymer, a block copolymer, or a homopolymer is used as the base polymer, preferably to form a hot melt adhesive. These base polymers can be produced by various catalyst systems including metallocenes. The tackifier is preferably present in the range of from about 10 to about 950 parts by weight, more preferably ranging from greater than 20 parts by weight to less than 500 parts by weight, where parts by weight is parts by weight per hundred parts by weight of the base polymer. The total amount of all additives is preferably in the range of from 0 to 500 parts by weight, more preferably from 0.5 to 400 parts by weight, even more preferably from 1 to 300 parts by weight, most preferably from 5 to 150 parts by weight. Preferred resins for this embodiment are terpolymers and more preferably comprise propylene as the alpha-olefin, dicyclopentadiene or norbomene as the cyclic olefin, and styrene or allyl benzene as the aromatic-group-containing monomer. Preferred HMA blends have a viscosity in the range of from 300 to 300,000 centipoise at 350° F. (0.3 to 200 Pa·s at 177° C.), preferably from 500 to 200,000 centipoise at 350° F. (0.5 to 100 Pa·s at 177° C.).

The components of the hot melt adhesive composition can be blended by ordinary methods known in the art for blending ethylene polymers, tackifiers, and the like. For example, an ethylene-vinyl acetate copolymer can be placed in a receptacle, heated, and stirred. Tackifier can be added to the receptacle so that a uniform dispersion is obtained. The blends can be produced by mixing the components using any suitable mixing device at a temperature above the melting point of the components, e.g. at 130° C. to 180° C. for a period of time sufficient to form a homogeneous mixture, normally 1 to 120 minutes depending on the type of mixing device.

Useful Applications

The blends of this invention can then be used as adhesives on substrates such as asphalt, cement, metals, Mylar™ (a biaxially-oriented polyethylene terephthalate), polymers (including polyolefins such as rubbers, plastics, thermoplastics, and oriented versions thereof), glass, ceramics, wood, paper, rocks, minerals and paint, cardboard, and the like. Preferred examples include polyethylene, polypropylene, and Mylar™. Examples of further applications that can comprise the new hydrocarbon resins described herein and be improved thereby include but are not limited to: sealants, contact adhesives, pressure sensitive adhesives, hot melt adhesives, hot melt pressure sensitive adhesive packaging, laminates, coating materials, bookbindings, structural adhesives, upholstery adhesives, wood adhesives, automotive adhesives, cement adhesives, asphalt adhesives (e.g. as an adhesive for affixing reflectors to asphalt), or construction adhesives, and the like.

The adhesives produced as described above can also be applied as a coating or film onto a backing material such as paper, corrugated paper, polyolefins, polyolefin films, polyesters, polyester films, metals, glass, thermoplastics, plastics, elastomers, thermoplastic elastomers (TPE's), natural substances such as wood and pulp; fabric, melt blown or spun bonded plastics, and the like. These adhesive/backing combinations can then be used in tapes and labels, diapers, feminine products, book binders, non-wovens, and the like.

With regard to specific applications, the preferred embodiments may vary due to the preferred balance of properties needed for end use performance. For example, the preferred level of tackifier to make a label PSA with the new class of tackifier resins of this invention would preferably be from about 55 to about 70% whereas for a high performance tape, the level of tackifier would preferably be from about 30 to about 55%. However, the principle of tackification with this new class of resins remains the constant factor. It has been unexpectedly discovered that these tackifiers raise the $T_g$ of various base polymers, especially the soft midblock of ABA styrenic block copolymers, while lowering the overall molecular weight of the blended adhesive composition. It is expected that one skilled in the adhesive arts, especially PSAs, would produce further embodiments that will balance the molecular weight and $T_g$ properties to obtain useful performance properties suitable for the end use targeted. Therefore, adjustment of the tackifier, rubber, and additives upwards and downwards with these materials is now possible to achieve a variety of new adhesives. The differences in these adhesives will be manifest in the balance of Hold, Tack, Peel, SAFT, and other properties as they are needed in the specific application.

EXAMPLES

The following examples demonstrate the invention and are not intended to limit it in any manner. Examples 1–41 are shown in Tables 1–4. The same example numbers are used in different tables to identify each of the resins from polymerization through characterization of the resins and performance testing of adhesive blends containing those same resins. Table 1 shows the methods of preparing polymers of alpha-olefins, and cyclic olefins both with and without aromatic-group-containing monomers. Numbered examples are novel resins while the examples labeled with letters are comparative examples. Table 2 shows the characterization of resins of Examples 1–17 and A–I and the performance of those resins in pressure sensitive adhesive blends. Table 3 shows the characterization of tackifier resins of Examples 18–19 and J–K and the performance of those resins in hot melt adhesive blends. Table 4 shows characterization data for resins of Examples 20–41.

Production of Tackifier Resins

Example 1

In Example 1, a 1-liter stainless steel Zipperclave™ polymerization reactor was purged with nitrogen and charged with 800 ml of hexane as a solvent; 0.482 mole of norbornene as a cyclic comonomer; 0.062 mole of styrene as an aromatic-group-containing monomer; and 0.5 ml of a 25 weight percent solution of tri-isobutyl aluminum in toluene (TIBA) as an aluminum alkyl compound scavenger. As an alpha-olefin monomer, 1.24 moles of liquid propylene was added to the reactor and the contents were stirred until the reactor contents reach a reaction temperature of 80° C. 0.08 mmole dimethyl bis(cyclopentadienyl) zirconium as a transition metal catalyst was pre-activated with an equimolar amount of an activator, dimethylanilinium tetrakis (pentafluorophenyl) boron (DMA-pfp) in 2 ml toluene. The activated catalyst was loaded in a stainless steel catalyst tube and charged into the reactor with a 50 ml rinse of the same type solvent as used in the reactor charge step using high-pressure nitrogen. The polymerization was allowed to proceed for a run time of 30 minutes at which time the reactor was vented and the polymerization quenched with a small amount of isopropanol. The product was isolated by concentrating the hexane solution on a rotary evaporator, and removing the unreacted cyclic comonomer under vacuum (0.2–5 torr, 150° C.–180° C., nitrogen sparge). Approximately 50 mg of a stabilizer, Irganox™ 1010 (tetrakis (methylene(3,5-di-tert-butyl-4hydroxyhydrocinnamate))), a stabilizer available from Ciba-Geigy Corp., Ardsley, N.Y., was added to prevent degradation during the vacuum distillation step. Resin yield by this process was 20.1 g.

Examples 2–41

Examples 2–41 were prepared using the same basic procedure as in Example 1 except that the types and amounts of starting components as well as process conditions were changed as shown in Table 1. Also, Examples 7, 10, 11, 13, 23–31, 41, A–C, G, H, J, and K were filtered through celite prior to the rotary evaporation step to remove any insoluble residues.

Comparative Examples A–Q

Comparative Examples A–I were prepared as in Examples 1–41 except that they do not contain an aromatic-group-containing monomer.

TABLE 1

| Ex. # | Solvent Type | Volume Solvent (ml) | Cyclic Comon.[a] | Aromatic Comon.[b] | Cyclic Feed (mole) | Aromatic Feed (mole) | Aluminum Alkyl Scavenger[c] | Al. Alkyl Vol. (ml) | C3= Feed (mole) | Reaction Temp. (°C) | Transition Metal Catalyst (TMC)[d] | TMC Amount (mmol) | Activator[e] | Run Time (hrs.) | Yield (g) | Activity[f] |
|---|---|---|---|---|---|---|---|---|---|---|---|---|---|---|---|---|
| 1 | hexane | 800 | NB | S | 0.482 | 0.062 | TIBA | 0.5 | 1.24 | 80 | Cp₂ZrMe₂ | 0.08 | DMA-pfp | 0.5 | 20.1 | 509 |
| 2 | hexane | 400 | NB | AB | 0.241 | 0.062 | TIBA | 0.5 | 0.62 | 80 | Cp₂ZrMe₂ | 0.08 | DMA-pfp | 0.5 | 2.8 | 71 |
| 3 | hexane | 800 | NB | S | 0.482 | 0.031 | TIBA | 0.5 | 1.24 | 80 | Cp₂ZrMe₂ | 0.08 | DMA-pfp | 0.5 | 17.5 | 443 |
| 4 | hexane | 800 | NB | S | 0.482 | 0.016 | TIBA | 0.5 | 1.24 | 80 | Cp₂ZrMe₂ | 0.08 | DMA-pfp | 0.5 | 14.6 | 370 |
| 5 | hexane | 400 | NB | AB | 0.241 | 0.031 | TIBA | 0.5 | 0.62 | 80 | Cp₂ZrMe₂ | 0.08 | DMA-pfp | 0.5 | 2.5 | 63 |
| 6 | hexane | 400 | NB | AB | 0.241 | 0.093 | TIBA | 0.5 | 0.62 | 80 | Cp₂ZrMe₂ | 0.08 | DMA-pfp | 0.5 | 3.4 | 86 |
| 7 | hexane | 12000 | NB | AB | 9.04 | 2.79 | TIBA | 0.5 | 18.6 | 80 | Cp₂ZrMe₂ | 1.19 | DMA-pfp | 0.5 | 70 | 118 |
| 8 | hexane | 800 | DCPD | AB | 0.605 | 0.124 | TIBA | 0.5 | 1.24 | 80 | Cp₂ZrMe₂ | 0.08 | DMA-pfp | 0.5 | 16.5 | 418 |
| 9 | hexane | 800 | DCPD | AB | 0.605 | 0.124 | TIBA | 0.5 | 1.24 | 80 | Cp₂ZrMe₂ | 0.08 | DMA-pfp | 0.5 | 24.2 | 613 |
| 10 | hexane | 600 | NB | MTHF | 0.482 | 0.026 | TIBA | 0.5 | 1.24 | 80 | Cp₂ZrMe₂ | 0.079 | DMA-pfp | 0.5 | 28 | 709 |
| 11 | hexane | 600 | NB | MTHF | 0.482 | 0.026 | TIBA | 0.5 | 1.24 | 80 | Cp₂ZrMe₂ | 0.079 | DMA-pfp | 0.5 | 21 | 532 |
| 12 | toluene | 800 | NB | S | 0.482 | 0.062 | TIBA | 0.5 | 1.24 | 80 | Cp₂ZrMe₂ | 0.08 | DMA-pfp | 0.5 | 22.3 | 565 |
| 13 | hexane | 800 | DCPD | S | 0.605 | 0.124 | TIBA | 0.5 | 1.24 | 80 | ZrSMe₂ | 0.05 | DMA-pfp | 0.5 | 7.5 | 313 |
| 14 | toluene | 800 | NB | S | 0.482 | 0.016 | TIBA | 0.5 | 1.24 | 80 | Cp₂ZrMe₂ | 0.08 | DMA-pfp | 0.25 | 16.6 | 841 |
| 15 | toluene | 800 | NB | S | 0.482 | 0.031 | TIBA | 0.5 | 1.24 | 80 | Cp₂ZrMe₂ | 0.08 | DMA-pfp | 0.5 | 24.9 | 630 |
| 16 | hexane | 560 | DCPD | AB | 0.424 | 0.083 | TIBA | 0.5 | 0.87 | 80 | ZrSMe₂ | 0.05 | DMA-pfp | 0.5 | 9.5 | 396 |
| 17 | hexane | 800 | DCPD | AB | 0.605 | 0.124 | TIBA | 0.5 | 1.24 | 80 | ZrSMe₂ | 0.05 | DMA-pfp | 0.5 | 6.7 | 279 |
| 18 | hexane | 800 | DCPD | AB | 0.605 | 0.186 | TIBA | 0.5 | 1.24 | 80 | Cp₂ZrMe₂ | 0.08 | DMA-pfp | 0.5 | 24.2 | 613 |
| 19 | hexane | 800 | NB | AB | 0.603 | 0.62 | TIBA | 0.5 | 1.24 | 80 | Cp₂ZrMe₂ | 0.08 | DMA-pfp | 0.5 | 16.5 | 418 |
| 20 | hexane | 800 | DCPD | AB | 0.605 | 0.124 | TIBA | 0.5 | 1.24 | 80 | Cp₂ZrMe₂ | 0.08 | DMA-pfp | 0.58 | 9.1 | 199 |
| 21 | hexane | 400 | DCPD | AB | 0.605 | 0.03 | TIBA | 0.5 | 1.24 | 80 | Cp₂ZrMe₂ | 0.08 | DMA-pfp | 0.5 | 8.6 | 218 |
| 22 | hexane | 400 | DCPD | AB | 0.605 | 0.03 | TIBA | 0.5 | 1.24 | 80 | ZrSMe₂ | 0.05 | DMA-pfp | 0.5 | 4.4 | 183 |
| 23 | hexane | 800 | DCPD | S | 0.605 | 0.24 | TIBA | 0.5 | 1.24 | 80 | Cp₂ZrMe₂ | 0.08 | DMA-pfp | 0.5 | 10.5 | 266 |
| 24 | hexane | 800 | DCPD | AB | 0.605 | 0.124 | TIBA | 0.5 | 1.24 | 80 | Cp₂ZrMe₂ | 0.08 | DMA-pfp | 0.5 | 8.5 | 215 |
| 25 | hexane | 800 | DCPD | S | 0.605 | 0.24 | TIBA | 0.5 | 1.24 | 80 | ZrSMe₂ | 0.05 | DMA-pfp | 0.5 | 16 | 667 |
| 26 | hexane | 600 | DCPD | AB | 0.605 | 0.062 | TIBA | 0.5 | 1.24 | 80 | ZrSMe₂ | 0.05 | DMA-pfp | 0.5 | 34.1 | 1421 |
| 27 | hexane | 600 | DCPD | S | 0.605 | 0.062 | TIBA | 0.5 | 1.24 | 80 | ZrSMe₂ | 0.05 | DMA-pfp | 0.5 | 32.8 | 1367 |
| 28 | hexane | 600 | NB | AB | 0.482 | 0.186 | TIBA | 0.5 | 1.24 | 80 | Cp₂ZrMe₂ | 0.1 | DMA-pfp | 0.5 | 26.1 | 527 |
| 29 | hexane | 800 | NB | S | 0.483 | 0.206 | TIBA | 0.5 | 1.24 | 80 | Cp₂ZrMe₂ | 0.08 | DMA-pfp | 0.5 | 16.3 | 413 |
| 30 | hexane | 800 | NB | S | 0.483 | 0.124 | TIBA | 0.5 | 1.24 | 80 | Cp₂ZrMe₂ | 0.08 | DMA-pfp | 0.5 | 19 | 481 |
| 31 | hexane | 800 | NB | S | 0.483 | 0.062 | TIBA | 0.5 | 1.24 | 80 | Cp₂ZrMe₂ | 0.08 | DMA-pfp | 0.5 | 14.4 | 365 |
| 32 | hexane | 800 | NB | S | 0.483 | 0.062 | TIBA | 0.5 | 1.24 | 80 | Cp₂ZrMe₂ | 0.08 | DMA-pfp | 0.5 | 15.7 | 397 |
| 33 | toluene | 800 | NB | S | 0.482 | 0.016 | TIBA | 0.5 | 1.24 | 80 | Cp₂ZrMe₂ | 0.08 | DMA-pfp | 0.5 | 30.3 | 767 |
| 34 | toluene | 800 | NB | S | 0.483 | 0.062 | TIBA | 0.5 | 1.24 | 80 | ZrSMe₂ | 0.05 | DMA-pfp | 0.5 | 3.1 | 129 |
| 35 | hexane | 800 | NB | S | 0.483 | 0.062 | TIBA | 0.5 | 1.24 | 80 | ZrSMe₂ | 0.05 | DMA-pfp | 0.5 | 2.4 | 100 |
| 36 | hexane | 800 | NB | S | 0.65 | 0.05 | TIBA | 0.5 | 1.24 | 80 | ZrSMe₂ | 0.05 | DMA-pfp | 0.5 | 3.4 | 142 |
| 37 | toluene | 800 | NB | S | 0.6 | 0.05 | TIBA | 0.5 | 1.24 | 80 | ZrSMe₂ | 0.05 | DMA-pfp | 0.5 | 4.8 | 200 |
| 38 | toluene | 800 | NB | S | 0.55 | 0.05 | TIBA | 0.5 | 1.24 | 80 | ZrSMe₂ | 0.05 | DMA-pfp | 0.5 | 4.6 | 192 |

TABLE 1-continued

Resin Production Process Conditions

| Ex. # | Solvent Type | Volume Solvent (ml) | Cyclic Comon.[a] | Aromatic Comon.[b] | Cyclic Feed (mole) | Aromatic Feed (mole) | Aluminum Alkyl Scavenger[c] | Al. Alkyl Vol. (ml) | C3= Feed (mole) | Reaction Temp. (°C.) | Transition Metal Catalyst (TMC)[d] | TMC Amount (mmol) | Activator[e] | Run Time (hrs.) | Yield (g) | Activity[f] |
|---|---|---|---|---|---|---|---|---|---|---|---|---|---|---|---|---|
| 39 | toluene | 800 | NB | S | 0.55 | 0.05 | TIBA | 0.5 | 1.24 | 80 | ZrSMe$_2$ | 0.05 | DMA-pfp | 0.5 | 16.2 | 675 |
| 40 | toluene | 800 | NB | S | 0.482 | 0.031 | TIBA | 0.5 | 1.24 | 80 | HfSSMe$_2$ | 0.05 | DMA-pfp | 0.5 | 3.6 | 150 |
| 41 | toluene | 800 | NB | S | 0.482 | 0.031 | TPBA | 0.5 | 1.24 | 80 | 02Z | 0.05 | DMA-pfp | 0.5 | 4.2 | 175 |
| A | hexane | 200 | NB | — | 0.151 | — | none | na | 0.31 | 80 | Cp$_2$ZrMe$_2$ | 0.079 | DMA-pfp | 0.5 | 3.8 | 96 |
| B | hexane | 200 | NB | — | 0.151 | — | TIBA | 0.5 | 0.31 | 80 | Cp$_2$ZrMe$_2$ | 0.079 | DMA-pfp | 0.5 | 3.6 | 91 |
| C | hexane | 200 | NB | — | 0.151 | — | TIBA | 0.5 | 0.31 | 80 | Cp$_2$ZrMe$_2$ | 0.079 | DMA-pfp | 0.5 | 4.6 | 116 |
| D | hexane | 400 | NB | — | 0.301 | — | TIBA | 0.5 | 0.62 | 80 | Cp$_2$ZrMe$_2$ | 0.079 | DMA-pfp | 0.5 | 10.9 | 276 |
| E | hexane | 400 | NB | — | 0.212 | — | TIBA | 0.5 | 0.62 | 80 | Cp$_2$ZrMe$_2$ | 0.079 | DMA-pfp | 0.5 | 8.8 | 223 |
| F | hexane | 200 | DCPD | — | 0.151 | — | TEAL | 0.2 | 0.31 | 80 | Cp$_2$ZrMe$_2$ | 0.079 | DMA-pfp | 0.5 | 7.3 | 185 |
| G | hexane | 400 | NB | — | 0.241 | — | TIBA | 0.5 | 0.62 | 80 | Cp$_2$ZrMe$_2$ | 0.079 | DMA-pfp | 0.5 | 11.8 | 299 |
| H | hexane | 400 | NB | — | 0.149 | — | TIBA | 0.5 | 0.62 | 75 | Cp$_2$ZrMe$_2$ | 0.079 | DMA-pfp | 1.0 | 9.0 | 114 |
| I | hexane | 200 | DCPD | — | 0.151 | — | TIBA | 0.5 | 0.31 | 80 | Cp$_2$ZrMe$_2$ | 0.079 | DMA-pfp | 0.5 | 4.8 | 122 |
| J | hexane | 400 | DCPD | — | 0.756 | — | TIBA | 0.5 | 1.24 | 80 | Cp$_2$ZrMe$_2$ | 0.079 | DMA-pfp | 0.5 | 42 | 1063 |
| K | hexane | 400 | NB | — | 0.301 | — | TIBA | 0.5 | 0.62 | 80 | Cp$_2$ZrMe$_2$ | 0.079 | DMA-pfp | 0.5 | 11 | 276 |

[a]DCPD dicyclopentadiene, 60–80 weight percent solution in hexane or toluene; NB = norbornene, in 50–80 weight percent solution in hexane or toluene
[b]AB = allyl benzene, neat; S = styrene, neat; MTHF = 1,4-Methano-1,4,4a,9a-tetrahydrofluorene, neat (methano-tetranydrofluorene)
[c]TIBA = tri-isobutyl aluminum, 25 weight percent solution in toluene; TEAL = tri-ethyl aluminum, 25 weight percent solution in heptane
[d]Me = methyl, Cp = cyclopentadienyl, Ind = indenyl; ZrSMe$_2$ = dimethyl[dimethylsilanyl bis(tetrahydroindenyl)]zirconium; HfSSMe$_2$ = Rac dimethyl[dimethylsilanyl bis(indenyl)]hafnium; Cp$_2$ZrMe$_2$ = Dimethyl bis(cyclopentadienyl)zirconium; 02Z = Dimethyl[dimethyl]silanyl(tetramethylcyclopentadienyl)(dodecyl-amino)]titanium
[e]DMA-pfp = dimethylanilinium tetrakis(pentafluorophenyl)boron
[f]Activity = (grams resin product)/(mmol TMC × hours)

Tackifier Resin Characterization and Adhesive Blend Performance

Tests and Standards

Differential Scanning Calorimetry (DSC, ASTM E-1356, at a heating rate of 5° C./minute) was used to measure $T_g$.

Gel Permeation Chromatography (GPC) was used to measure $M_n$, $M_w$, and Z-average molecular weight ($M_z$) GPC data was obtained on a Waters 590/712 WISP equipped with Polymer Labs Mixed D, $10^4$ Å, 500 Å, and 50 Å columns in THF, equipped with an RI detector. GPC values reported are polystyrene equivalent molecular weights that have been converted to polyisobutylene values according to the following formula:

log(PIB mol. wt.)=1.11×log(polystyrene mol. wt.)−0.517

Softening point of some of the tackifier resins was measured by the Ring and Ball method (ASTM E-28).

Performance of the adhesive blends were measured by: Ball Tack (ASTM D-3121; PSTC-6 [PSTC=Pressure Sensitive Tape Council]); 180° Peel (PSTC-1); Shear Adhesion Failure Temperature (SAFT, ASTM D-4498); Loop Tack (described below); holding power (PSTC-7); Saybolt color (ASTM D-156-94); Gardner color (ASTM D-1544); Blend Cloud Point (explained in detail below); T-peel (described in discussion of adhesive Examples 16 and 17 below); set time (explained in detail below); and blend viscosity (explained in detail below).

Loop tack involves contacting an adhesive tape surface to a solid substrate and measuring the force required to separate the adhesive tape and the solid substrate using the following technique. Test specimens are cut from standard films to 1"×9" (2.54 cm×22.9 cm) dimensions. A loop is made out of test strip with the adhesive side out and the ends are attached using masking tape. Tests are run at standard conditions of 23° C.±2° C. and 50% humidity. Stainless steel substrate panels (2"×5"×1/16" (5.08 cm×6.45 cm×0.16 cm)) are used and each test is prepared individually and tested immediately (within one minute). An Instron is prepared for the testing by attaching a 90° Quick Stick jig to the lower jaw of the Instron. A clean stainless steel panel is placed in the test jig. The ends of a test loop are attached in the top jaw of the Instron and the loop is lowered onto the test panel at the rate of 2"/min (5.08 cm/min) until approximately 5" (12.7 cm) of test specimen is in contact with the panel. The adhesive tape contacts the stainless steel substrate with no pressure other than the weight of the tape itself. The test specimen is then pulled at the rate of 2"/min. Average loop values are reported in lbs/inch for a minimum of three determinations.

Set time is defined as the minimum amount of time required for a bond to be formed between a hot melt adhesive and a paper substrate. A large piece of corrugated paper board was lined with one inch square sections. Strips of 1 inch by 4 inch kraft paper were adhered to the empty space with a hot melt adhesive. One small drop of adhesive at 350° F. (177° C.) was placed on the corrugated board square then immediately a strip of kraft paper was placed on the drop and compressed with a 500 g weight for a timed period. The kraft strip was then pulled rapidly away to determine if a sufficiently strong bond is formed to tear the paper fiber. The minimum time required is recorded as the set time. All of the EVA adhesives on the table exhibited less than one second set time which was considered to be sufficient performance to make the adhesive a probable -candidate for a cardboard box closure adhesive.

The wax cloud point of the HMA blend formulations described in Table 3 were obtained by heating the contents to 200° C. in a test tube with constant stirring using a thermometer. The test tube was then held at a 45° angle and cooled in air. The cloud point is defined as the temperature at which the first sign of persistent cloud or haze forms around the thermometer bulb. The procedure is repeated until two consecutive readings agree within 1°–2° C. The cloud point reported is an average and indicates the relative compatibility of the tackifier with the other components in the HMA formulation.

The melt viscosity of the HMA blend formulations described in Table 3 were determined using a Brookfield Digital Viscometer (Model RVTA) according to ASTM D-3236.

Holding Power is a modified Pressure Sensitive Tape Council (PSTC) procedure PSTC-7. A 1.2 cm wide strip of tape is adhered with a 2 kg roller to a stainless steel panel so that the overlap is 1.3 cm by 1.3 cm. A 2 kg weight is suspended from the tape and the plate assembly is hung at a 178° angle until the bond fails. The elapsed time to failure is recorded. This test is performed at room temperature.

Proton Nuclear Magnetic Resonance ($^1$H NMR) data was obtained on a Varian 500 MHz spectrometer using the following conditions: pulse angle 30°, pulse delay 5 seconds, acquisition 3 seconds, spectral width 10,000Hz, transients greater than or equal to 48. Mole percent comonomer incorporation was determined by comparing peak areas for the following chemical shift assignments (relative to TMS) versus the total integral for all protons in the spectrum:

| Comonomer | proton(s) | chemical shift, ppm |
|---|---|---|
| Dicyclopentadiene | olefinic | 5.52, 5.64 |
| Ethyl Norbornene | olefinic | 5.22, 5.05 |
| Norbornene | bridgehead | 1.8–2.3 |
| Allyl Benzene | aromatic | 7.1–7.4 |
| Styrene | aromatic | 7.1–7.4 |

Examples 1–17 and Comparative Examples A–I

The tackifier resins produced as shown in Table 1 blended with a block copolymer of styrene-isoprene-styrene available from DEXCO Polymers, Houston, Tex., under the trade name VECTOR 4111™ (a styrene-isoprene-styrene (SIS) block copolymer having a polystyrene equivalent weight average molecular weight of greater than 100,000, an $M_w/M_n$ of less than 1.1, and a styrene content of 18 weight percent; for more information on DEXCO copolymers see the Adhesive Age, June 1994, article by Jean Tancrede, pp. 27–32, fully incorporated herein by reference for purposes of U.S. patent practice) into the following PSA formulation:

| Component | Parts by Weight |
|---|---|
| Vector ™ 4111 | 100 |
| Tackifier resin | 100 |
| Flexon ™ 766 | 20 |
| IRGANOX ™ 1010 | 1 |
| Total PSA | 221 |

The tackifier and the block copolymer were solution blended using toluene (40 wt. % solids). The resulting blends were cast onto 1.5 mil (38.1 mm) Mylar™ film (available from Dupont de Nemours, E. I., Company, Wilmington, Del.) and the solvent evaporated to give a 1.5 mil (38.1 mm) dry layer of the formulated adhesive. Flexon™ 766 is a naphthenic oil available from Exxon Chemical Company, Houston, Tex.

TABLE 2

Pressure Sensitive Additive Performance

| | Tackifier Resin | | | | | | | | | | | Adhesive | | | | | Aged 180° | |
|---|---|---|---|---|---|---|---|---|---|---|---|---|---|---|---|---|---|---|
| Ex. # | Cyclic Comon. | Mole Percent Cyclic Comon. | Aromatic Comon. | Mole Percent Aromatic Comon. | Weight Percent Aromatic Comon. | $T_g$ °C. | $M_n$ | $M_w$ | $M_w/M_n$ | $M_z$ | Saybolt Color | 180° Peel, lb./in. (N/25.4 mm) | Rolling Ball Tack, cm | Loop Tack, lb./in. (N/25.4 mm) | SAFT °F (°C.) | Holding Power (hrs) | Peel, lb./in. (N/25.4 mm)[a] | Rolling Ball Tack, cm - aged[a] |
| 1 | NB | 70% | S | 4.3% | 5.5% | 23 | 357 | 582 | 1.63 | 840 | 28.2 | 2.4 (10.7) | 3.1 | 1.8 (8.0) | 185 (85) | 1.7 | 2.1 (9.3) | 2.7 |
| 2 | NB | 67% | AB | 1.9% | 2.9% | 37 | 385 | 595 | 1.54 | 823 | 6.4 | 3.4 (15.1) | 2.7 | 2 (8.9) | 183 (84) | nd | nd | nd |
| 3 | NB | 69% | S | 2.2% | 2.9% | 32 | 397 | 644 | 1.62 | 933 | 27.6 | 2.7 (12.0) | 3.4 | 1.8 (8.0) | 194 (90) | 11.6 | 2.4 (10.7) | 2.6 |
| 4 | NB | 67% | S | 1.1% | 1.5% | 31 | 398 | 675 | 1.70 | 988 | 27.9 | 2.3 (10.2) | 4 | 1.3 (5.8) | 190 (88) | 41.6 | 2.1 (9.3) | 3.5 |
| 5 | NB | 71% | AB | 0.9% | 1.3% | 39 | 402 | 585 | 1.45 | 811 | -1.6 | 3.4 (15.1) | 4.1 | 1.9 (8.5) | 198 (92) | nd | nd | nd |
| 6 | NB | 69% | AB | 2.8% | 4.1% | 35 | 409 | 650 | 1.58 | 917 | 15.4 | 3.7 (16.5) | 5.1 | 2.3 (10.2) | 183 (84) | nd | nd | nd |
| 7 | NB | 73% | AB | 3.7% | 5.3% | 39 | 426 | 702 | 1.65 | 1032 | 29.1 | 2.4 (10.7) | 3.5 | 1.5 (6.7) | 194 (90) | 300+ | 2.9 (12.9) | 4.6 |
| 8 | DCPD | 34% | AB | 2.3% | 3.6% | 35 | 470 | 801 | 1.7 | 1242 | 28.9 | 2.9 (12.9) | 3.9 | nd | 181 (83) | nd | nd | nd |
| 9 | DCPD | 38% | AB | 3.4% | 5.1% | 45 | 479 | 824 | 1.72 | 1272 | 30.6 | 3.7 (16.5) | 4.9 | nd | 187 (86) | nd | nd | nd |
| 10 | NB | 67% | MTHF | 2.5% | 5.2% | 52 | 483 | 791 | 1.64 | 1,157 | 28.6 | 2.8 (12.4) | 18 | 2.1 (9.3) | 207 (97) | 70+ | nd | nd |
| 11 | NB | 74% | MTHF | 4.6% | 9.0% | 62 | 506 | 799 | 1.58 | 1,161 | 28.9 | 3.3 (14.7) | 6.6 | 3.9 (17) | 210 (99) | 70+ | nd | nd |
| 12 | NB | 60% | S | 2.3% | 3.2% | 35 | 553 | 940 | 1.70 | 1399 | 28.9 | no tack | >30 | no tack | no tack | nd | nd | >30 |
| 13 | DCPD | 40% | S | 5.0% | 64% | 46 | 594 | 1001 | 1.69 | 1483 | 26.3 | no tack | >30 | no tack | no tack | nd | nd | >30 |
| 14 | NB | 60% | S | 0.8% | 1.1% | 45 | 600 | 1062 | 1.77 | 1604 | 29.5 | no tack | >30 | no tack | no tack | nd | nd | >30 |
| 15 | NB | 56% | S | 1.1% | 1.6% | 35 | 605 | 1029 | 1.70 | 1538 | 28.8 | 0.4 (1.8) | >30 | nd | 178 | nd | nd | >30 |
| 16 | DCPD | 38% | AB | 3.8% | 5.7% | 46 | 708 | 1205 | 1.70 | 1821 | 27.8 | 0.3 (1.3) | >30 | nd | 179 | nd | nd | >30 |
| 17 | DCPD | 37% | AB | 3.2% | 4.9% | 54 | 771 | 1275 | 1.65 | 1916 | 24.5 | 1.6 (7.1) | >30 | 1.7 (7.8) | 195 (91) | nd | nd | nd |
| A | NB | 69% | NA | 0.0% | 0.0% | 43 | 376 | 702 | 1.87 | 1,131 | nd | 2.5 (11.1) | 30 | 0.65 (2.9) | 198 (92) | nd | nd | nd |
| B | NB | 56% | NA | 0.0% | 0.0% | 48 | 381 | 726 | 1.91 | 1,159 | 25.0 | 1.5 (6.7) | >30 | 0.98 (4.4) | 199 (93) | nd | nd | nd |
| C | NB | 56% | NA | 0.0% | 0.0% | 46 | 392 | 721 | 1.84 | 1,118 | 25.2 | 2.4 (10.7) | >30 | 0.5 (2.2) | 200 (93) | nd | nd | nd |
| D | NB | 71% | NA | 0.0% | 0.0% | 55 | 419 | 712 | 1.70 | 1,098 | nd | 1.57 (7.0) | 30 | 0.55 (2.4) | 195 (91) | nd | nd | nd |
| E | NB | 61% | NA | 0.0% | 0.0% | 36 | 442 | 733 | 1.66 | 1,072 | nd | 3.0 (13.3) | 30 | 1 (4.4) | 190 (88) | nd | nd | nd |
| F | DCPD | 41% | NA | 0.0% | 0.0% | 60 | 456 | 971 | 2.13 | 2,966 | nd | 0.82 (3.6) | >30 | 0.35 (1.55) | 205 (96) | nd | nd | nd |
| G | NB | 64% | NA | 0.0% | 0.0% | 41 | 470 | 765 | 1.63 | 1,118 | nd | 0.75 (3.3) | >30 | 0 | 157 (69) | nd | nd | nd |
| H | NB | 59% | NA | 0.0% | 0.0% | 24 | 487 | 887 | 1.82 | 2,798 | nd | 2.2 (9.8) | >20 | 1.38 (6.2) | 194 (90) | nd | nd | nd |
| I | DCPD | 42% | NA | 0.0% | 0.0% | 61 | 499 | 1,038 | 2.08 | 2,823 | nd | | | | | | | | nd = no data; NA = not applicable;
[a]Oven-aged for 3 weeks at 70° C.

For 15 of the 17 examples where color was measured, the Saybolt color of the untreated resins was 15 or more. A Saybolt color of 15 equates to a Gardner color of approximately 3. The Saybolt values of 20 or more in Examples 1, 3, 4, and 7–15 are better than a Gardner color of approximately 1.5. The Saybolt values of 25 or more in Examples 1, 3, 4, and 7–14 exceed the typical validity limit of the Gardner color scale and are considered to meet the commercially desirable standard of "near water white". Examples 2 and 5 are higher color. The higher color may be due to catalyst residues as a result of the low yields observed for these samples or caused by exposure to air during the high temperature vacuum stripping process.

Examples 1–17 in Table 2 show adhesive compositions based on 100 parts of Vector 4111, 100 parts of a tackifier resin of this invention, 20 parts of Flexon 766, and 1 part Irganox™ 1010. Comparative adhesive examples A–I were formulated by using similar cyclic copolymer resins without the aromatic-group-containing group as a termonomer.

As shown in Table 2, Examples 1–11, 16, and 17 all show measurable adhesive performance in one or more of the tested adhesive performance attributes of 180° Peel, Loop Tack, Rolling Ball Tack, SAFT, and holding power.

The resins of this invention demonstrate an improved balance of adhesive properties over their non-aromatic analogs in similar adhesive blends. Examples 1–4 and comparative Examples A–C have $M_n$ values of about 300–400 and contain comparable molar contents of propylene and cyclic monomers. However, 180° Peel for Examples 1–4 ranges from 2.3 to 3.4 lb/in (10.3 to 15.2N/25.4 mm) and rolling ball tack ranges from 2.7 to 4.0 cm while comparative examples A–C have 180° Peel ranging from 1.5 to 2.5 lb/in (6.7 to 11.2N/25.4 mm) and rolling ball tack values of greater than 30 cm.

Examples 5–11 and comparative Examples D–I have $M_n$ values of about 400–500 and contain comparable molar contents of propylene and cyclic monomers. However, 180° Peel for Examples 5–11 ranges from 2.4 to 3.7 lb/in (10.7 to 16.5N/25.4 mm) and rolling ball tack of 3.1 to 18 cm while comparative examples D–I have 180° Peel ranging from 1.6 to 3.0 lb/in (7.1 to 13.4N/25.4 mm) and have rolling ball tack values ranging from 20 to greater than 30 cm.

The adhesive compositions of Examples 12–15 are believed to suffer from some type of contamination which hindered their adhesive performance. The adhesive blends of Examples 12–15 were visibly cloudy as opposed to the transparent adhesive mixtures of lower $M_n$ Examples 1–11 and higher $M_n$ Examples 16 and 17, which also exhibited measurable tack. Furthermore, the adhesive blends of Examples 12–15, in contrast to the other examples, left a residue on the steel plate substrates used in many of the adhesive performance tests. Possible causes of the lower performance of Examples 12–15 include some level of undesirable insitu homopolymerization of the styrene monomers during polymerization of the tackifier.

Examples 18–19 and Comparative Examples J–K

In Examples 18–19 and comparative examples J–K below, a series of hot melt adhesives (HMA) were prepared based on the following formulation:

| Component | Weight percent |
|---|---|
| Escorene ™ UL 7720 | 38.5 |
| Cyclic copolymer tackifier | 25 |
| Escorez ™ 1310LC | 18.7 |
| Paraflint ™ H-1 | 17.3 |
| Irganox ™ 1076 | 0.5 |
| Total HMA | 100 |

Escorene™ UL 7720, also known as XW8.36™ is an ethylene-vinyl acetate copolymer (EVA) comprising about 28 weight percent vinyl acetate and having a melt index of about 150 dg/min. as measured by ASTM D-1238 condition E, and a density of about 0.934 g/cc as measured by ASTM D-1505, and is available from Exxon Chemical Company, Houston, Tex. The composition of the cyclic copolymer tackifiers used in these HMA blends is shown in further detail in Table 3, Examples 18 and 19. Escorez™ 1310LC is an aliphatic hydrocarbon resin having an $M_n$ of approximately 1450, an $M_w/M_n$ of approximately 2.1, and a DSC $T_g$ of about 45° C., and is available from Exxon Chemical Company, Houston, Tex. Paraflint™ H-1 (a synthetic paraffin Fischer-Tropsch wax available from Moore & Munger Marketing, Inc., Sheldon, Conn.) is a wax available from Unocal Corp., Los Angeles, Calif. Irganox™ 1076 is an oxidation inhibitor and thermal stabilizer available from Ciba-Geigy Corp., Ardsley, N.Y. Formulations were prepared at a nominal temperature of 150° C. Once the components had melted in the quiescent state, a hand held stirrer was used to mix them. Stirring was continued for 10 minutes after visual inspection indicated that a homogeneous blend had been achieved.

Each of the HMA formulations was laid out to form a thin film suitable for bonding. The HMA was heated to 150° C. in an oven, then laid out on silicon lined release paper using an eight path applicator to achieve a film that had a nominal thickness of about 0.005" (0.127 mm). The HMA films were used to bond cast films of polyethylene (Escorene™ LD-117, cast film, 10 mils [0.127 mm] thick). Seals were made in a Theller Impulse Heat Sealer at 300° F. (150° C.), the adhesive being sandwiched between polyethylene film using a pressure of approximately 40 p.s.i. (276 kPa) for a dwell time of 2 seconds. For purposes of T-Peel testing, 1 inch (2.54 cm) wide strips were cut from the bonded sandwich of polyethylene film and HMA. Test pieces were allowed to age for a minimum of 24 hours prior to evaluating the strength of the bond. T-peel testing was carried out in controlled environmental conditions of 23° C. and 50 percent relative humidity on a Tinius Olsen testing frame with an extension rate of 2 inches/minute (51 mm/minute). In the case of adhesives exhibiting only slip/stick failure, the T-peel strength was taken as the average of the peaks on the force/deformation plot. When samples showed evidence of smooth peel the T-peel strength was taken as the average of the regions of smooth peel. In cases where both smooth and slip/stick peel were exhibited by the same sample, the average value of the smooth peel is recorded. For each HMA formulation, 3 bonds were tested and the results averaged. The shear adhesion failure temperature was determined against kraft paper or polypropylene using a 1 inch×1 inch square (25.4 mm×25.4 mm) square bonded area and a loading of 500 g.

TABLE 3

Resin Characterization and Hot Melt Adhesive Performance

| | Tackifier Resin | | | | | | | | | | Adhesive | | | | Blend viscosity, |
|---|---|---|---|---|---|---|---|---|---|---|---|---|---|---|---|
| Example No. | Cyclic Comon. | Mole Percent Cyclic Comon. | Aromatic Comon. | Mole Percent Aromatic Comon. | Weight Percent Aromatic Comon. | $T_g$ °C. | $M_n$ | $M_w$ | $M_w M_n$ | $M_z$ | Blend Cloud Point, °C. | T-peel to PE lb./in. (N/ 25.4 mm) | Set time (sec.) | SAFT, °F. (°C.) | cps @ 350° F. (Pa·s @ 177° C.) |
| 18 | DCPD | 38% | AB | 3.4% | 5.1% | 45 | 479 | 824 | 1.72 | 1272 | 125 | 0.3 (1.35) | <1 | 174 (79) | 1570 (1.570) |
| 19 | NB | 74% | AB | 4.3% | 6.1% | 43 | 432 | 670 | 1.55 | 954 | 142 | 0.3 (1.35) | <1 | 167 (75) | 1040 (1.040) |
| J | DCPD | 38% | NA | 0.0% | 0.0% | 71 | 654 | 1231 | 1.88 | 2035 | 173 | 0.2 (0.9) | <1 | 176 (80) | 1865 (1.865) |
| K | NB | 71% | NA | 0.0% | 0.0% | 55 | 419 | 712 | 1.7 | 1098 | 152 | 0.2 (0.9) | <1 | 168 (76) | 1145 (1.145) |

Examples 18 and 19 describe adhesive compositions based on 38.5 weight percent of Escorene™ 7720, 25 weight percent of a tackifier resin of this invention, 18.7 weight percent of Escorez™ 1310LC, 17.3 weight percent of Paraffint™ H-1, and 0.5 weight percent of Irganox™ 1076. Comparative Examples J and K were formulated as in Examples 16 and 17 except that the tackifier of this invention was replaced with an equal weight percent of a similar cyclic copolymer resin without an aromatic-group-containing group as a termonomer. Examples 18 and 19 (blends of a tackifier of this invention and a conventional tackifier) exhibit comparable T-peel and SAFT performance with their non-aromatic analogs, Comparative Examples J and K, respectively. However, Examples 18 and 19 show lower values, thus improved performance, for both blend viscosity and blend cloud point. This shows that the new tackifier resins of this invention containing aromatic groups provide an improved balance of properties over that of similar cyclic copolymer resins without the aromatic groups.

Table 4 shows resin characterization data for Examples 20–41.

TABLE 4

Resin Characterization

| Ex. # | Cyclic Comon. | Mole Percent Cyclic Comon. | Aromatic Comon. | Mole Percent Aromatic Comon. | Weight Percent Aromatic Comon. | Tg °C. | $M_w$ | $M_n$ | $M_w/M_n$ | $M_z$ |
|---|---|---|---|---|---|---|---|---|---|---|
| 20 | DCPD | 38% | AB | 4.0% | 6.0% | 52 | 878 | 535 | 1.64 | 1317 |
| 21 | DCPD | 39% | AB | 0.8% | 1.2% | 63 | 1049 | 633 | 1.66 | 1603 |
| 22 | DCPD | 37% | AB | 0.8% | 1.2% | 65 | 1852 | 1069 | 1.73 | 2917 |
| 23 | DCPD | 33% | S | 12.0% | 15.8% | 17 | 457 | 289 | 1.58 | 666 |
| 24 | DCPD | 37% | S | 6.2% | 8.1% | 33 | 633 | 391 | 1.62 | 941 |
| 25 | DCPD | 37% | S | 9.0% | 11.6% | 32 | 726 | 431 | 1.68 | 1059 |
| 26 | DCPD | 37% | S | 1.2% | 1.6% | 63 | 1625 | 883 | 1.84 | 2561 |
| 27 | DCPD | 39% | S | 1.2% | 1.6% | 63 | 1637 | 893 | 1.83 | 2587 |
| 28 | NB | 65% | AB | 5.0% | 7.4% | 30 | 690 | 441 | 1.56 | 985 |
| 29 | NB | 57% | S | 11.3% | 14.9% | 3 | 442 | 288 | 1.53 | 627 |
| 30 | NB | 60% | S | 8.1% | 10.8% | 14 | 500 | 317 | 1.58 | 722 |
| 31 | NB | 68% | S | 4.5% | 5.8% | 26 | 585 | 370 | 1.58 | 836 |
| 32 | NB | 63% | S | 4.2% | 5.6% | 24 | 596 | 379 | 1.57 | 852 |
| 33 | NB | 58% | S | 0.9% | 1.3% | 32 | 1067 | 575 | 1.86 | 1622 |
| 34 | NB | 41% | S | 2.4% | 3.8% | 13 | 1087 | 582 | 1.87 | 1749 |
| 35 | NB | 40% | S | 2.4% | 3.9% | 22 | 1123 | 674 | 1.67 | 1673 |
| 36 | NB | 40% | S | 1.1% | 1.8% | 37 | 2662 | 1180 | 2.26 | 13794 |
| 37 | NB | 40% | S | 1.2% | 2.0% | 37 | 2689 | 1257 | 2.14 | 12585 |
| 38 | NB | 40% | S | 12.0% | 17.8% | 35 | 2712 | 1265 | 1.24 | 7663 |
| 39 | NB | 30% | S | 4.0% | 6.9% | 20 | 3303 | 1651 | 2.00 | 5620 |
| 40 | NB | 24% | S | 0.3% | 0.6% | 20 | 10611 | 3656 | 2.90 | 20929 |
| 41 | NB | 25% | S | 0.5% | 0.9% | 55 | 31108 | 6756 | 4.60 | 64851 |

All references described above, including testing procedures and priority documents, are incorporated by reference in their entirety. As is apparent from the foregoing description, the materials prepared and the procedures followed relate to specific preferred embodiments of the broad invention. For example, higher molecular weight resins comprising an alpha-olefin, cyclic olefin, and aromatic-group-containing monomer have low color and general utility as polymers for many end uses while the lower $M_n$ higher $T_g$ versions of this copolymer are especially suited for tackifying adhesives. Adhesive compositions of this invention include the use of blends of two or more tackifying resins of this invention or blends one or more tackifying resins of this invention with conventional tackifiers. It is apparent from the foregoing general description and the specific embodiments that, while forms of the invention have been illustrated and described, various modifications can be made without departing from the spirit and scope of this invention. Accordingly, it is not intended that the invention be limited thereby.

What is claimed is:

1. A hydrocarbon tackifier resin which is the polymerization reaction product of at least one alpha-olefin, at least one cyclic olefin, and at least one aromatic-group-containing monomer, wherein said aromatic-group-containing monomer comprises at least one polymerizable double bond and, wherein the cyclic structures of the cyclic olefin monomers remain substantially intact and the total aromatic-group-containing monomer content is at least 0.5 mole percent of the resin, and wherein the tackifier resin has a $M_w/M_n$ of about 3 or less.

2. The resin of claim 1 wherein the total aromatic-group-containing monomer content is less than about 90 mole percent of the resin.

3. The resin of claim 1 having an $M_n$ of 2000 or less.

4. The resin of claim 1 having a $T_g$ of about 0° C. or more.

5. The resin of claim 1 wherein the tackifier produced has a $T_g$ of 100° C. or less.

6. The resin of claim 1 wherein the tackifier produced has an $M_n$ in the range of from about 200 to about 1000.

7. The resin of claim 1 having a cyclic olefin content in the range of from about 5 to about 90 mole percent.

8. The resin of claim 1 wherein the alpha-olefin is a linear or branched mono-olefin containing from 3 to 8 carbon atoms, the cyclic olefin is a non-conjugated diene containing up to 30 carbon atoms, and the aromatic-group-containing monomer contains one aromatic group and up to 30 carbon atoms.

9. The resin of claim 1, said tackifier resin having been hydrogenated.

10. The resin of claim 1 having a Saybolt color of 15 or more.

11. A process for producing a hydrocarbon tackifier resin, said process comprising polymerizing a monomer feed of at least one alpha-olefin, at least one cyclic olefin, and at least one aromatic-group-containing monomer, said aromatic-group-containing monomer comprising at least one polymerizable double bond, in the presence of a metallocene catalyst system, wherein said monomer feed contains from 0.1 to 10 moles of alpha-olefin and from 0.1 to 10 moles of aromatic-group-containing monomers to every mole of cyclic olefin.

12. The process of claim 11 wherein the monomer feed is polymerized at a temperature of 60° C. or greater.

13. The process of claim 11 wherein the metallocene catalyst system comprises a cyclopentadienyl transition metal compound wherein the cyclopentadienyl ligands are selected from the group consisting of: unbridged bis-cyclopentadienyl; silicon bridged bis-indenyl; silicon bridged cyclopentadienyl amide; carbon bridged cyclopentadienyl fluorenyl; carbon bridged bis-cyclopentadienyl; and carbon bridged cyclopentadienyl indenyl.

14. The process of claim 11 wherein the metallocene catalyst system comprises an activator comprising an alumoxane or a non-coordinating anion.

15. The process of claim 11 wherein the alpha-olefin is a linear or branched mono-olefin containing from 3 to 8 carbon atoms, the cyclic olefin is a non-conjugated diene containing up to 30 carbon atoms, and the aromatic-group-containing monomer contains one aromatic group and up to 30 carbon atoms.

16. The process of claim 11 further comprising hydrogenating the resin.

17. An adhesive comprising the resin of claim 1.

18. The adhesive of claim 17 further comprising a base polymer which is a random copolymer, a block copolymer, or a homopolymer.

19. An article of manufacture comprising the adhesive of claim 17.

* * * * *

UNITED STATES PATENT AND TRADEMARK OFFICE
CERTIFICATE OF CORRECTION

PATENT NO.   : 5,874,512
DATED        : February 23, 1999
INVENTOR(S)  : James M. Farley, et al.

Figure 2:
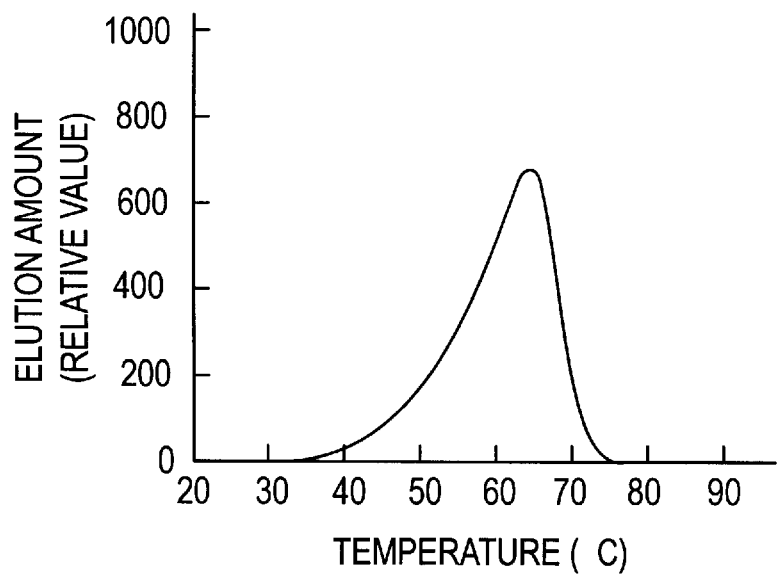
Figure 3A:
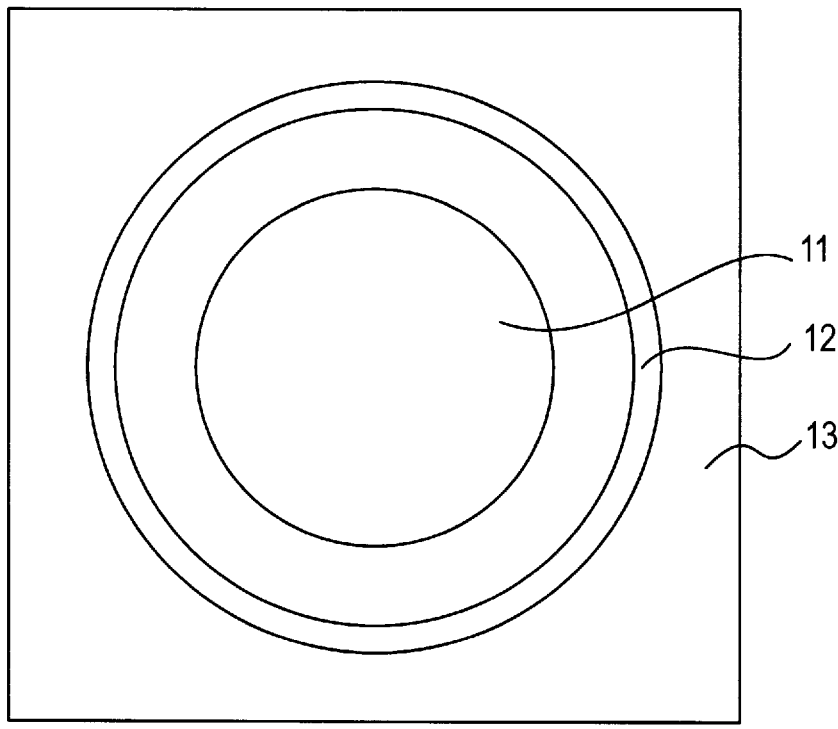
Figure 3B:
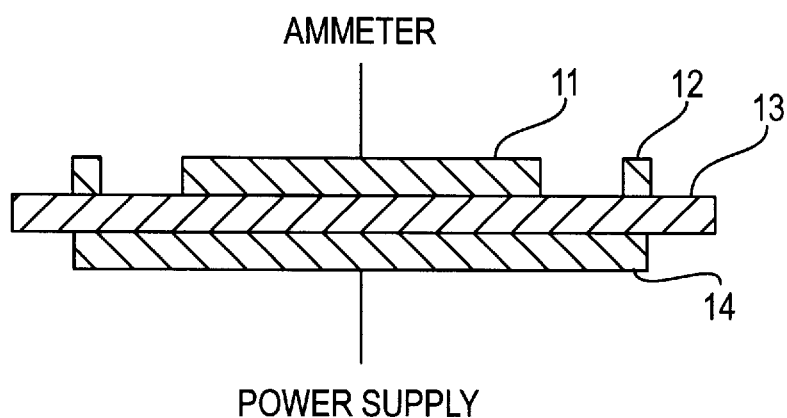
Figure 4:
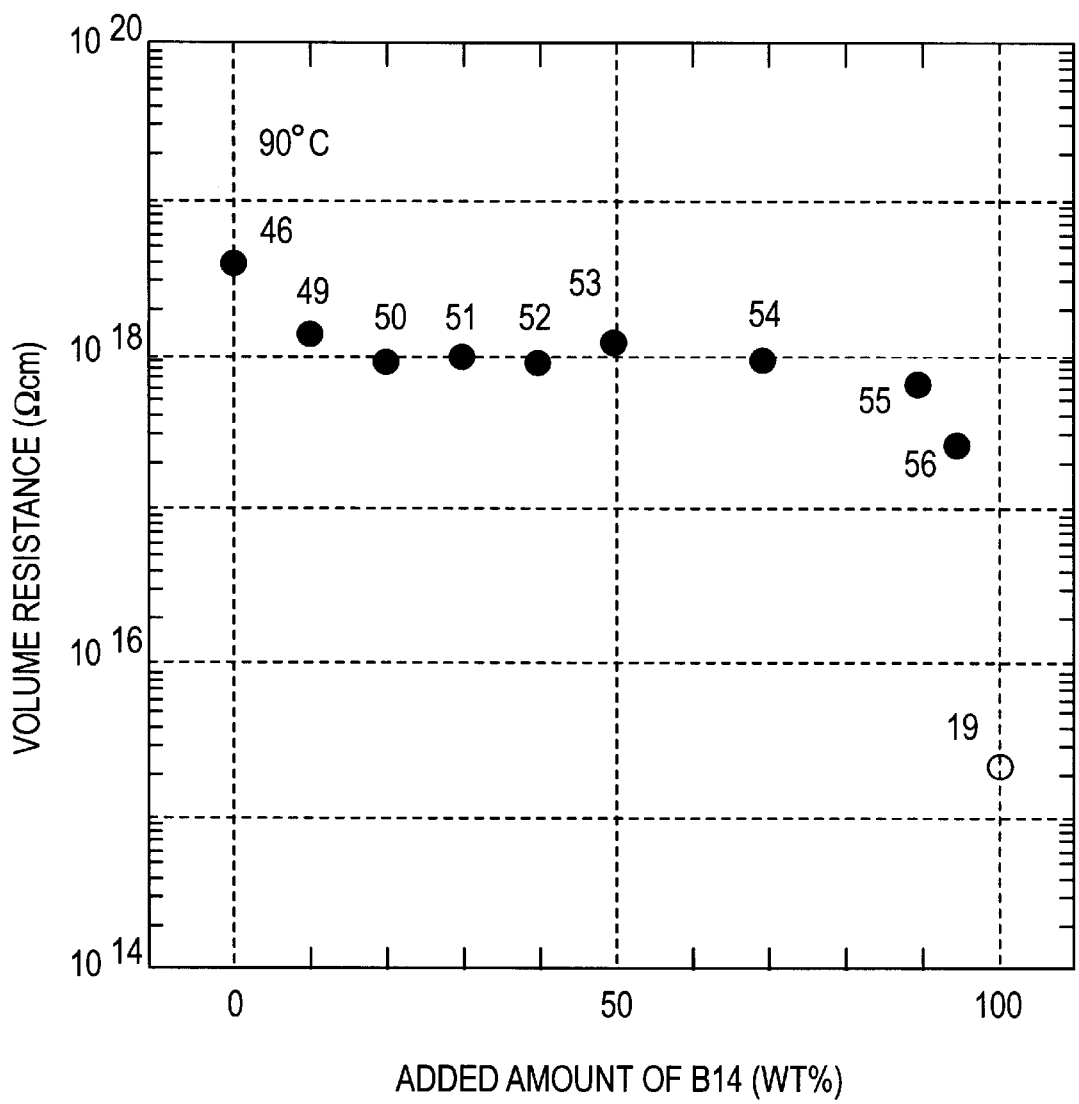

It is certified that error appears in the above-identified patent and that said Letters Patent is hereby corrected as shown below:

Delete (3) Drawing Sheets - Figures 1, 2, 3(a), 3(b) and 4

Signed and Sealed this

Eleventh Day of July, 2000

*Attest:*

Q. TODD DICKINSON

*Attesting Officer*                *Director of Patents and Trademarks*